United States Patent
Humpleman et al.

(10) Patent No.: US 7,043,532 B1
(45) Date of Patent: *May 9, 2006

(54) METHOD AND APPARATUS FOR UNIVERSALLY ACCESSIBLE COMMAND AND CONTROL INFORMATION IN A NETWORK

(75) Inventors: Richard Humpleman, Fremont, CA (US); Dongyan Wang, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/307,004

(22) Filed: May 7, 1999

Related U.S. Application Data

(60) Provisional application No. 60/084,578, filed on May 7, 1998.

(51) Int. Cl.
  *G06F 15/173* (2006.01)
  *G06F 15/16* (2006.01)
(52) U.S. Cl. ...................... 709/208; 709/223
(58) Field of Classification Search .............. 709/223, 709/208, 328, 227; 345/329, 733, 734; 707/102; 715/733, 734; 719/317, 328
See application file for complete search history.

(56) References Cited

U.S. PATENT DOCUMENTS

| | | | |
|---|---|---|---|
| 4,031,543 A | 6/1977 | Holz | |
| 4,860,006 A | 8/1989 | Barall | |
| 5,249,043 A | 9/1993 | Grandmougin | |
| 5,257,366 A * | 10/1993 | Adair et al. | 707/4 |
| 5,293,635 A | 3/1994 | Faulk, Jr. et al. | |
| 5,347,304 A | 9/1994 | Moura et al. | |
| 5,387,927 A | 2/1995 | Look et al. | |
| 5,389,963 A | 2/1995 | Lepley et al. | |

(Continued)

FOREIGN PATENT DOCUMENTS

EP 84110755.0 9/1984

(Continued)

OTHER PUBLICATIONS

Evans, G. "Solving home automation problems using artificial intelligence techniques", IEEE Trans. on Consumer Electronics, pp. 395-400, Aug. 1991.*

(Continued)

*Primary Examiner*—Patrice Winder
(74) *Attorney, Agent, or Firm*—Michael Zarrabian, Esq.; Kenneth L. Sherman, Esq.; Myers, Dawes, Andras & Sherman, LLP

(57) ABSTRACT

A method and system for performing a service on a home network, by: connecting a first and a second home device to the home network; providing a database including a plurality of application interface description data objects, where each application interface description data object includes information in a structured format for commanding and controlling of a home device by one or more other home devices connected to the network; the second home device accessing a first application interface description object for the first home device in the database; the first home device accessing a second application interface description object for the second home device in the database; sending control and command data from the first home device to the second home device utilizing the second application interface description object over the network; and sending control and command data from the second home device to the first home device utilizing the first application interface description object over the network. Whereby, the first and second home devices perform said service.

27 Claims, 14 Drawing Sheets

U.S. PATENT DOCUMENTS

| | | | |
|---|---|---|---|
| 5,392,033 A | | 2/1995 | Oman et al. |
| 5,452,291 A | | 9/1995 | Eisenhandler et al. |
| 5,488,412 A | | 1/1996 | Majeti et al. |
| 5,495,561 A | * | 2/1996 | Holt ........................... 358/1.15 |
| 5,526,483 A | * | 6/1996 | French et al. .................. 714/4 |
| 5,546,484 A | | 8/1996 | Fling et al. |
| 5,561,709 A | | 10/1996 | Remillard et al. |
| 5,570,085 A | * | 10/1996 | Bertsch ..................... 340/3.54 |
| 5,572,643 A | | 11/1996 | Judson |
| 5,579,308 A | | 11/1996 | Humpleman |
| 5,596,702 A | * | 1/1997 | Stucka et al. ............... 345/746 |
| 5,612,730 A | | 3/1997 | Lewis |
| 5,636,211 A | * | 6/1997 | Newlin et al. .............. 370/465 |
| 5,657,221 A | * | 8/1997 | Warman et al. ............... 700/83 |
| 5,740,362 A | * | 4/1998 | Buickel et al. ............. 709/201 |
| 5,778,226 A | * | 7/1998 | Adams et al. ............. 709/311 |
| 5,790,789 A | * | 8/1998 | Suarez ....................... 709/202 |
| 5,826,000 A | | 10/1998 | Hamilton |
| 5,860,010 A | * | 1/1999 | Attal .......................... 717/137 |
| 5,864,669 A | * | 1/1999 | Osterman et al. ........... 709/203 |
| 5,886,732 A | | 3/1999 | Humpleman |
| 5,909,183 A | * | 6/1999 | Borgstahl et al. ...... 340/825.22 |
| 5,940,072 A | | 8/1999 | Jahanghir et al. |
| 5,940,387 A | | 8/1999 | Humpleman |
| 5,953,526 A | * | 9/1999 | Day et al. ................... 717/108 |
| 5,956,487 A | * | 9/1999 | Venkatraman et al. ...... 709/218 |
| 6,005,861 A | | 12/1999 | Humpleman |
| 6,020,924 A | | 2/2000 | Jahanghir |
| 6,032,202 A | * | 2/2000 | Lea et al. ....................... 710/8 |
| 6,037,933 A | | 3/2000 | Blonstein et al. |
| 6,052,750 A | | 4/2000 | Lea et al. |
| 6,078,783 A | | 6/2000 | Kawamura et al. |
| 6,085,236 A | | 7/2000 | Lea |
| 6,101,499 A | | 8/2000 | Ford et al. |
| 6,128,619 A | * | 10/2000 | Fogarasi et al. ............ 707/102 |
| 6,134,594 A | * | 10/2000 | Helland et al. ............. 709/229 |
| 6,151,624 A | * | 11/2000 | Teare et al. ................. 709/217 |
| 6,175,362 B1 | | 1/2001 | Harms et al. |
| 6,181,333 B1 | | 1/2001 | Chaney et al. |
| 6,182,094 B1 | | 1/2001 | Humpleman et al. |
| 6,188,397 B1 | | 2/2001 | Humpleman |
| 6,189,019 B1 | * | 2/2001 | Blumer et al. .............. 707/513 |
| 6,191,781 B1 | | 2/2001 | Chaney et al. |
| 6,198,479 B1 | * | 3/2001 | Humpleman et al. ....... 345/733 |
| 6,288,716 B1 | * | 9/2001 | Humpleman et al. ....... 345/733 |
| 6,349,352 B1 | * | 2/2002 | Lea .............................. 710/72 |
| 6,466,971 B1 | * | 10/2002 | Humpleman et al. ....... 709/220 |
| 6,539,422 B1 | * | 3/2003 | Hunt et al. .................. 709/217 |
| 6,546,419 B1 | * | 4/2003 | Humpleman et al. ....... 709/223 |
| 6,560,639 B1 | * | 5/2003 | Dan et al. .................... 709/218 |
| 6,618,764 B1 | * | 9/2003 | Shteyn ....................... 709/249 |

FOREIGN PATENT DOCUMENTS

| | | |
|---|---|---|
| EP | 90305213.2 | 5/1990 |
| EP | 91401245.5 | 5/1991 |
| EP | 96304706.3 | 6/1996 |
| EP | 96306507.3 | 9/1996 |
| EP | 96307200.4 | 9/1996 |
| EP | 96116873.9 | 10/1996 |
| EP | 97100356.1 | 1/1997 |
| EP | 97117812.4 | 10/1997 |
| JP | 9-261355 | 10/1997 |
| JP | 9-282263 | 10/1997 |
| JP | 10-145773 | 5/1998 |
| JP | 11-88406 | 3/1999 |
| JP | 11-194987 | 7/1999 |
| JP | 11-317756 | 11/1999 |
| JP | 11-355294 | 12/1999 |
| JP | 11-355357 | 12/1999 |
| WO | PCT/EP95/00191 | 1/1995 |
| WO | PCT/US95/00354 | 11/1995 |
| WO | PCT/US95/17108 | 12/1995 |
| WO | PCT/US96/18798 | 11/1996 |
| WO | PCT/US97/08490 | 5/1997 |

OTHER PUBLICATIONS

Deng, Shuang "Capture effect in residential Ethernet LAN", IEEE GLOBEC, ISBN: 0-7803-2509-5, pp. 1678-1682, Nov. 1995.*

Kokubun, T. et al. "Object-oriented database system with GIS for optical cable network operation", IEEE GLOBEC, ISBN: 0-7803-3336-5, pp. 1521-1527, Nov. 1996.*

Corcoran, P.M. et al. "Browser-style interfaces to a home automation network", IEEE Trans. on Consumer Electronics, pp. 1063-1069, Jun. 1997.*

Corcoran, P.M. "Mapping home-network appliances to TCP/IP sockets using hree-tiered home architecture", IEEE Trans on Consumer Electronics, pp. 729-736, Jun. 1998.*

* cited by examiner

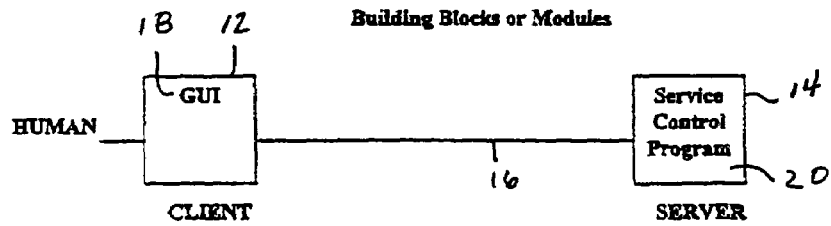
FIG. 1
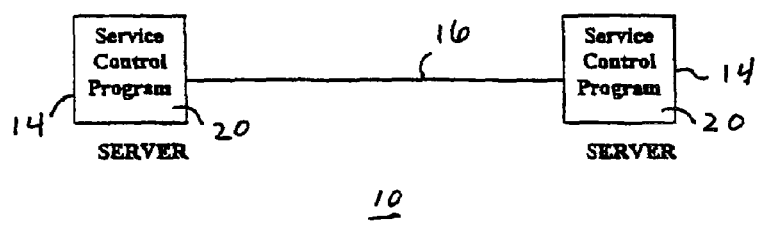
FIG. 3
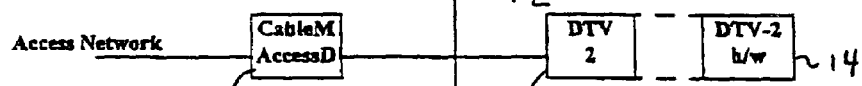
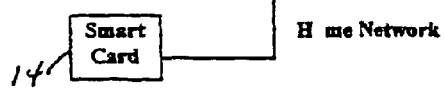

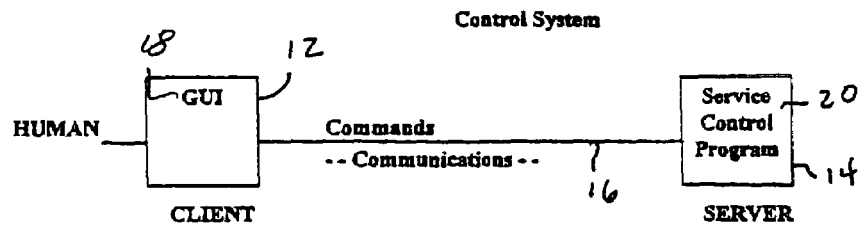
FIG. 2
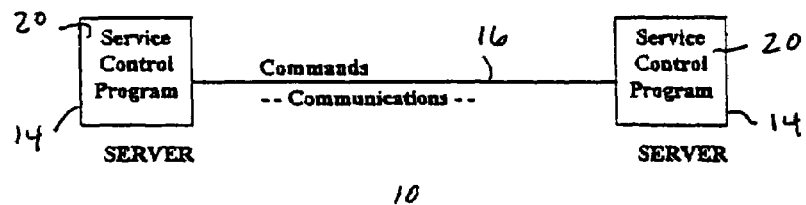
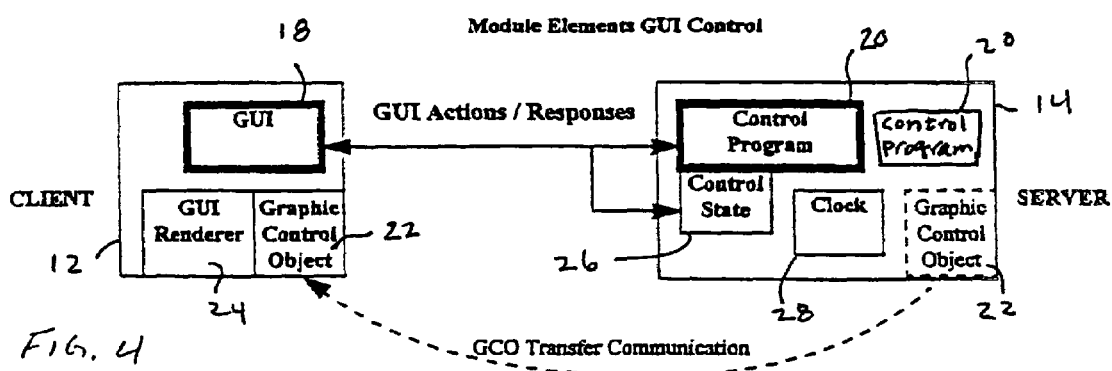
FIG. 4
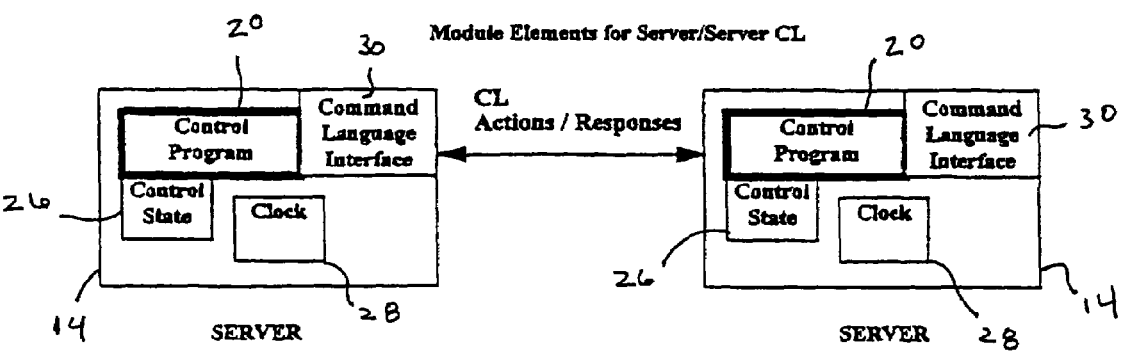
FIG. 7

Table 1: Capabilities Table

| Service | Sink/Source |
|---|---|
| Service A | Sink |
| Service B | Source |
| Service C | Source |
| Service D | Sink |

FIG. 10

Table 2: Attributes Table

| DeviceManufacturer | 20 chars | Device manufacturer's name |
|---|---|---|
| ManufacturerURL | 60 chars | Device manufacturer's home page URL |
| ManufacturerIcon | 20 chars | Name of Device manufacturer's Icon |
| DeviceName | 30 chars | Device name |
| DeviceModel | 20 chars | Device model number |
| DeviceType | 20 chars | Device category |
| DeviceLocation | 30 chars | Device group or location |
| DefaultSource | 15 chars | Data type, Default source device (IP address) |
| DefaultSink | 15 chars | Data type, Default sink device (IP address) |
| DeviceIcon | 20 chars | Name of device icon |

FIG. 11

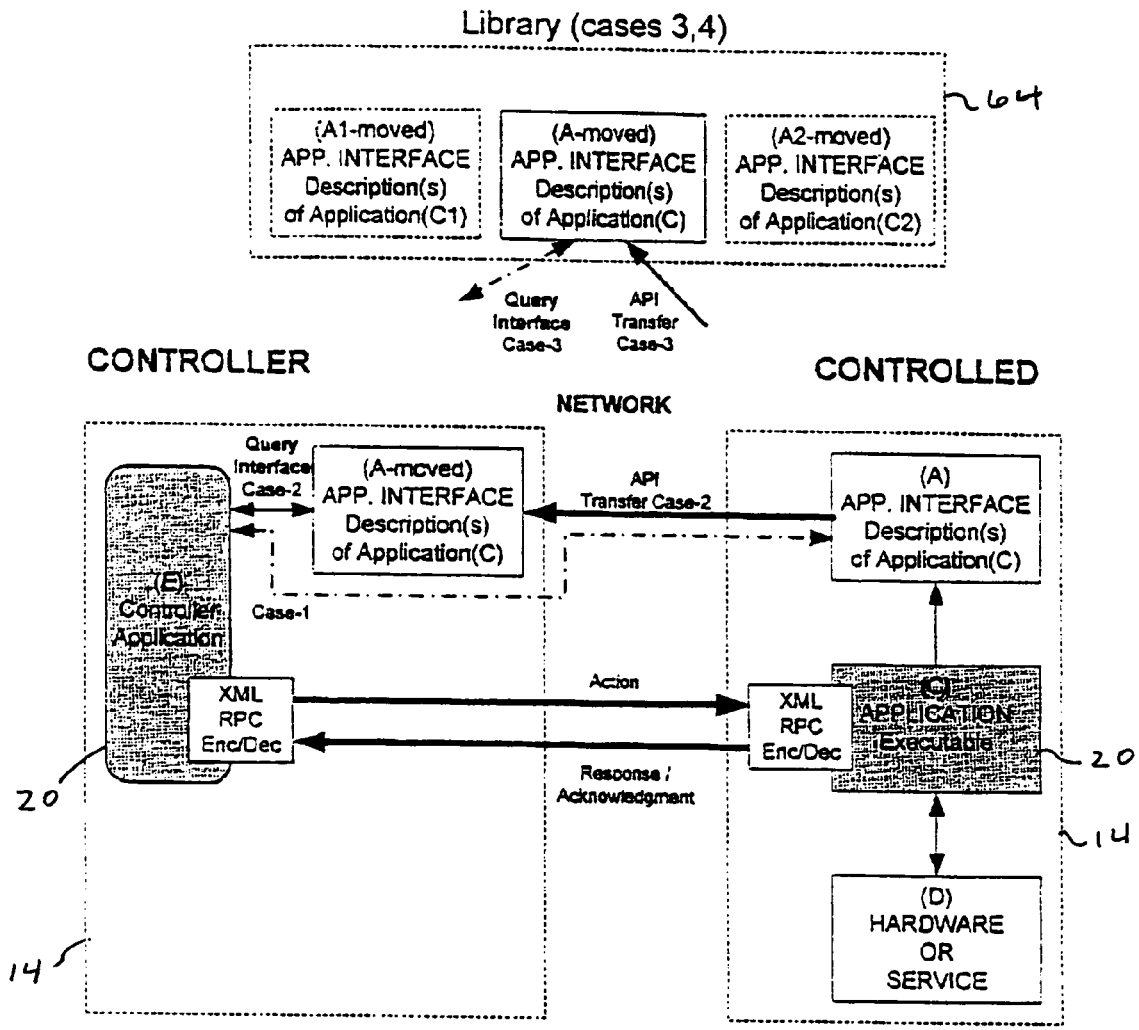

Case 1. XML Application-C INTERFACE (A) for remote query by (E)
Case 2. Move XML Application-C INTERFACE (A) to controller for local query by (E)
Case 3. Move XML Application-C INTERFACE (A) to 3rd party device -a collecting place (library) for all Interfaces for remote query by (E). The library would have to have the address (URI) of the associated application available for direct control action and responses.
Case 4. Is case 3 but the 'indirect' control action (and response) is also directed at the library device. In this case the library is built with a 'forwarder'.

FIG. 17

CALL.DTD describes the message format of XMLRPC output. It can be used by receiver of XMLRPC message for validity check.

Relation between Interface Library & XCE Database

Relation between Interface Library & XCE Database

Example of Hierarchical IL & Device Interfaces

Hierarchical Interface Structure. Four layers.

| Layer | Interface Layer | Interface Example |
|---|---|---|
| 1 | XML interface for each HN, listing current available devices. | MyHN (VCRs, TVs...) |
| 2 | General XML interfaces for each device, listing function categories. | General VCR Interface. (Record, play...) |
| 3 | Specific XML interface for each function category for a device. | VCR.record category. |
| 4 | Specific XML interface for each function in a function category. | VCR.record.tdr function |

112 — row 1
114 — row 2
116 — row 3
118 — row 4

FIG. 22

Table 3: Example Formats and Types

| Type | Format |
|---|---|
| command | CAL, AV/C, X-10 |
| image | jpeg, gif, bitmap, tiff |
| language | English, French, etc. |
| video_stream | mpeg2 |
| video_clib | avi, quicktime, mpeg |
| text | html, plain |
| audio | wav, aiff |
| application | msword, pdf, postscript, gzip |

FIG. 24

METHOD AND APPARATUS FOR UNIVERSALLY ACCESSIBLE COMMAND AND CONTROL INFORMATION IN A NETWORK

CROSS-REFERENCES TO RELATED APPLICATIONS

Applicant claims the benefit of U.S. Provisional Application No. 60/084,578 entitled "Command and Control Using XML", filed on May 7, 1998 which is incorporated herein by reference. The present application is related to the following copending applications that are commonly assigned and which are incorporated herein by reference: U.S. patent application Ser. No. 09/104,299, entitled "Browser Based Command and Control Home Network" now U.S. Pat. No. 6,288,716; U.S. patent application Ser. No. 09/104,297, entitled "Method and Apparatus for A Home Network Auto-Tree Builder"; U.S. patent application Ser. No. 09/104,298, entitled "Improved Home Network, Browser Based, Command and Control" now U.S. Pat. No. 6,198,479; U.S. patent application Ser. No. 9/103,469, entitled "Method and Apparatus for Creating Home Network Macros" now U.S. Pat. No. 6,243,707; and U.S. patent application Ser. No. 09/104,606, entitled "Programming Tool For Home Networks now U.S. Pat. No. 6,182,904.

FIELD OF THE INVENTION

The present invention relates to the field of network systems, and more particularly, to home network having multiple devices connected thereto.

BACKGROUND OF THE INVENTION

A network generally includes a communication link and various devices with communication capability connected to the communication link. The devices include computers, peripheral devices, routers, storage devices, and appliances with processors and communication interfaces. An example of a network is a home network for a household in which various devices are interconnected. A usual household can contain several devices including personal computers and home devices that are typically found in the home. As such the term "device" typically includes logical devices or other units having functionality and an ability to exchange data, and can include not only all home devices but also general purpose computers. Home devices include such electronic devices as security systems, theater equipment, TVS, VCRs, stereo equipment, and direct broadcast satellite services or (DBSS), also known as digital satellite services (DSS), sprinkler systems, lighting systems, micro waves, dish washer, ovens/stoves, washers/dryers, and a processing system in an automobile.

In general, home devices are used to perform tasks that enhance a homeowner's life style and standard of living. For example, a dishwasher performs the task of washing dirty dishes and relieves the homeowner of having to wash the dishes by hand. A VCR can record a TV program to allow a homeowner to watch a particular program at a later time. Security systems protect the homeowner's valuables and can reduce the homeowner's fear of unwanted entry.

Home devices, such as home theater equipment, are often controlled using a single common control unit, namely a remote control device. This single common control unit allows a homeowner to control and command several different home devices using a single interface. Thus, may manufacturers have developed control units for controlling and commanding their home devices from a single interface.

One drawback associated with using the remote control unit to command and control home devices is that it provides static and command logic for controlling and commanding each home device. Another drawback associated with using remote control units is that known remote control units cannot control a plurality of diverse devices, and more particularly, cannot control a plurality of devices having different capabilities to communicate with each other in order to accomplish tasks or provide a service.

In conventional network systems a user provides commands using a remote control unit or device control panel. Once the user ceases, there is no controller unit or device in the network to provide commands for automatic operation. After a user initially controls and commands a first set of devices, conventional systems do not provide a mechanism for the first set of devices to automatically communicate with a second set of devices in the network as necessary in order to accomplish tasks without direct user control and command of the second set of devices. Further, conventional systems do not provide an efficient method for various network devices to obtain information about other network devices in the network for command and control.

There is, therefore, a need for a method and a system which provides dynamic control and command devices in a home network. There is also a need for such a method and system to provide the ability to control a plurality of diverse devices having different capabilities to communicate with each other in order to accomplish tasks or provide a service. There is also a need for such a method and system to provide the ability for various network devices to automatically command and control other various network devices. There is also a need for such a method and system to provide universally accessible command and control information for inter-device communication.

SUMMARY OF THE INVENTION

The present invention satisfies these needs. In one embodiment the present invention provides a method and system for performing a service on a home network, by: connecting a first and a second home device to the home network; providing a database including a plurality of application interface description data objects, where each application interface description data object includes information in a structured format for commanding and controlling of a home device by one or more other home devices connected to the network; the second home device accessing a first application interface description object for the first home device in the database; the first home device accessing a second application interface description object for the second home device in the database; sending control and command data from the first home device to the second home device utilizing the second application interface description object over the network; and sending control and command data from the second home device to the first home device utilizing the first application interface description object over the network. Whereby, the first and second home devices perform said service.

In one version of the invention, the first home device stores first application interface data therein, and the second home device stores second application interface data therein. The database is formed by querying the first and second home devices to transfer said application interface data for the first and second home devices to the database device.

The database can be stored in a database device and connected to the network for universal access by network devices. In that case, the first application interface description object for the first home device can be provided from the data base to the second home device over the network. Further, the second application interface description object can be provided from the data base to the first home device over the network.

Further, three or more home devices can be connected to the network, wherein at least one home device accesses the database to query the application interface description objects of a plurality of home devices for sending command and control data to the plurality of home devices over the network. Each application interface description object can include data in a structured format. The structured format can include XML format.

BRIEF DESCRIPTION OF THE DRAWINGS

These and other features, aspects and advantages of the present invention will become better understood with regard to the following description, appended claims and accompanying drawings where:

FIG. 2 shows the block diagram of FIG. 1 in an example device control and communication scenario;

FIG. 3 shows a block diagram of an example home network system according to the present invention which includes a plurality of client and server devices;

FIG. 4 shows a block diagram of example embodiments of a client device and a server device of FIG. 3;

FIG. 7 shows a block diagram of two example networked server devices capable of communication with, and control of, one another;

FIG. 10 shows an example capabilities data table for a network device;

FIG. 11 shows an example attribute data table for a network device;

FIG. 17 shows another example inter-device control architecture between a controller server device and a controlled server device;

FIG. 18 shows an embodiment of an XML protocol providing a Web standard common middleware layer in a communication stack at the API level between networked devices;

FIG. 22 shows an example of layers in device interface definition of FIG. 21;

FIG. 24 shows an example table of a partial list of packet types and formats for providing translation services according to an aspect of the present invention.

DETAILED DESCRIPTION OF THE INVENTION

In one aspect, the present invention provides inter-device communication in a network such as a home network. As home devices become more intelligent and can share information, inter-device communication allows a user to interconnect devices in a network to take advantage of the information sharing capabilities of those devices. As such, inter-device communication plays a crucial role in affording a user with the ability to fully and flexibly utilize the networked devices.

Figure 1B:
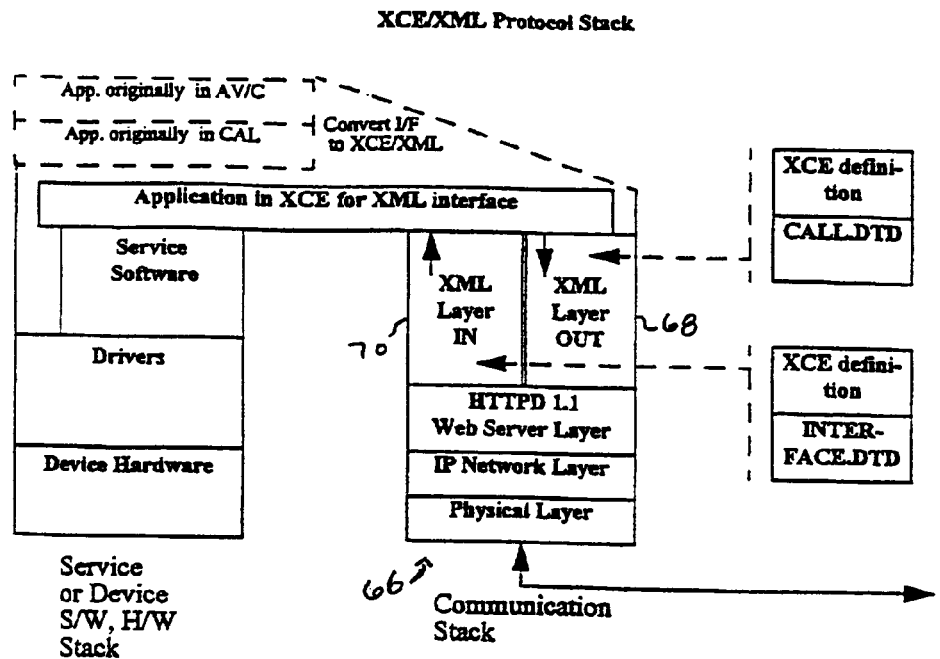
FIG. 1 shows a block diagram on an embodiment of a network according to one aspect of the present invention.

Referring to FIG. 1, in an embodiment of the present invention, a network 10 includes at least one client device 12 and at least one server device 14 interconnected via a communication link 16. The communication link 16 can include a 1394 serial bus providing a physical layer (medium) for sending and receiving data between the various connected home devices. The 1394 serial bus supports both time-multiplexed audio/video (A/V) streams and standard IP (Internet Protocol) communications. In certain embodiments, a home network uses an IP network layer as the communication layer for the home network. However, other communication protocols could be used to provide communication for the home network.

Each client device 12 may communicate with one or more server devices 14 in the network 10. Further, each server device 14 may communicate with one or more other server devices 14, and one or more client devices 12, in the network 10. Each client device 12 can include a user communication interface including input devices such as a mouse and keyboard for receiving user input, and a display for providing a control user interface for a user to interact with the networked devices. The user interface can include a graphical user interface (GUI) display 18 for providing information to the user. Referring to FIG. 2, as defined herein, each server device 14 provides a service for the user, except control user interface, and each client device 12 provides control user interface for user interaction with the network 10. As such, only client devices 12 interact directly with users, and server devices 14 interact only with client devices 12 and other server devices 14. Example services can include MPEG sourcing/sinking and display services.

FIG. 3 shows a block diagram of an example home network 10 that includes a plurality of client devices 12 and a plurality of server devices 14. Each server device 14 may include hardware as a resource in the network for providing services to the user. Further, each server device 14 may store a server or service control program 20 for controlling the server hardware, and include a graphical control object (GCO) user interface description 22 for user interface with the server control program 20 as shown in FIG. 4.

For control between a controlling client device 12 and a controlled server device 14, the client device 12 accesses the GCO 22 of the server device 14 by, for example, transferring the GCO 22 from the server device 14 to the client device 12 over the network. The client device 12 then uses the transferred GCO 22 to create a control user interface GUI 18 for the user to communicate with the control program 20 of the server device 14 from the client device 12 over the network. The user provides command and control to at least the control program 20 of the server device 14 from the client device 12.

Storing the GCO 22 of each server device 14 in the server device itself may reduce the processing and storage requirements of the client devices 12 in networks with several server devices 14. Further, storing the GCOs 22 in the server devices 14 may allow each server device 14 to provide its own GUI look and feel to the user, and allows for modification or updating of the GCOs 22 without modifications to client devices 12.

Referring to FIG. 4, to provide command and control between a client device 12 and the server device 14, in one embodiment, the client device 12 can include a renderer 24 for displaying a GUI 18 using a GCO 22 stored in the client device 12 or transferred to the client device 12 over the network from a desired server device 14. For example, in an initial device selection phase, the client device 12 can fetch the GCO 22 of at least one server device 14 over the network, and the renderer 24 displays a GUI 18 using the GCO 22 for controlling the server device 14. Preferably, the GUI 18 is customized to the server device 14 and can include a built-in command set for controlling the server device 14.

In addition, the GUIs 18 of various server devices 14 may include commonalities such as: (1) a common GCO model type for the client device renderer 24 to display GUIs 18, (2) common communication protocols for transferring the GCOs 22 from various server devices 14 to the client device 12, and (3) common communication protocols for GUI interaction from the client device 12 to the control program 20 of the corresponding server device 14, wherein the client device 12 does not require a built-in knowledge of a particular server device 14 being controlled.

Referring still to FIG. 4, a server device 14 may include one or more server control programs 20 to control the server hardware for providing a service. The GUI interface 18 from the GCO 22 of the server device 14 provides interface to the server device control programs 20. The server device 14 may also include control state data 26 indicating the control status of the server device 14 and server device hardware in providing a requested service.

For example, the control state data 26 can include the status of control information in the GUI 18 for the server device 14, such as timer setup for a recording action in a VCR server device. The control state data 26 is stored in the controlled server device 14, and displayed to a user through the GUI 18 of the server device 14 at the controlling client device 12, for user control of the server device 14. Preferably, the controlling client device 12 for displaying the GUI 18 of the server device 14 does not retain knowledge of the control state data 26 for the controlled server device 14.

Each server device 14 can be controlled by one or more client devices 12. As such, the control state data 26 stored in the server device 14 includes status of the information in the GUI 18 of the server device 14 at each of the controlling client devices 12. For example, when the user controls a server device 14 using a first client device 12, upon completion of the user control, the information in the GUI 18 of the server device 14 at the first client device 12 is saved by the server device 14 in the control state data 26 of the server device 14.

Alternatively, while the user is interacting with the GUI 18 of the server device 14 at the first client device 12, the control state data 26 of the server device 14 is updated with the information in the GUI 18 of the server device 14 at the first client device 12, and upon completion of user control, the control state data 26 is retained in the server device 14. When the user controls the server device 14 using a second client device 12, the control state data 26 is made available to the user via the GUI 18 of the server device 14 at the second client device 12 for further control. The user can also use the first client device 12 at a later time to control the server device 14, whereupon the control state data 26 is made available to the user via the GUI 18 of the server device 14 at the first client device 12 for further control. The server device 14 can also include a clock 28, or maintains the current time, to allow time delay action based on time or clock input from a user, as described below.

Figure 5:
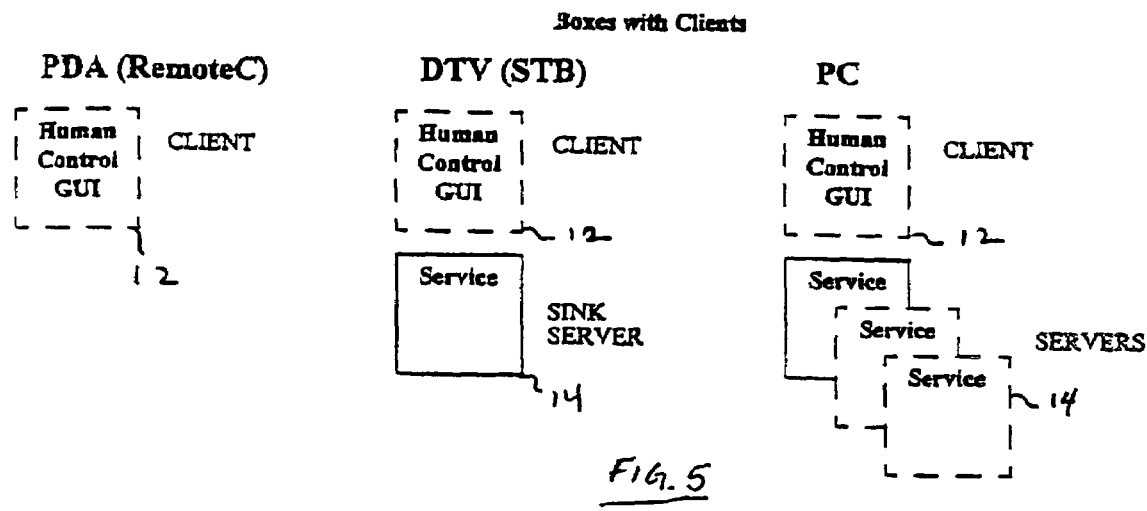
FIG. 5 shows example embodiments of client devices.
Figure 6:
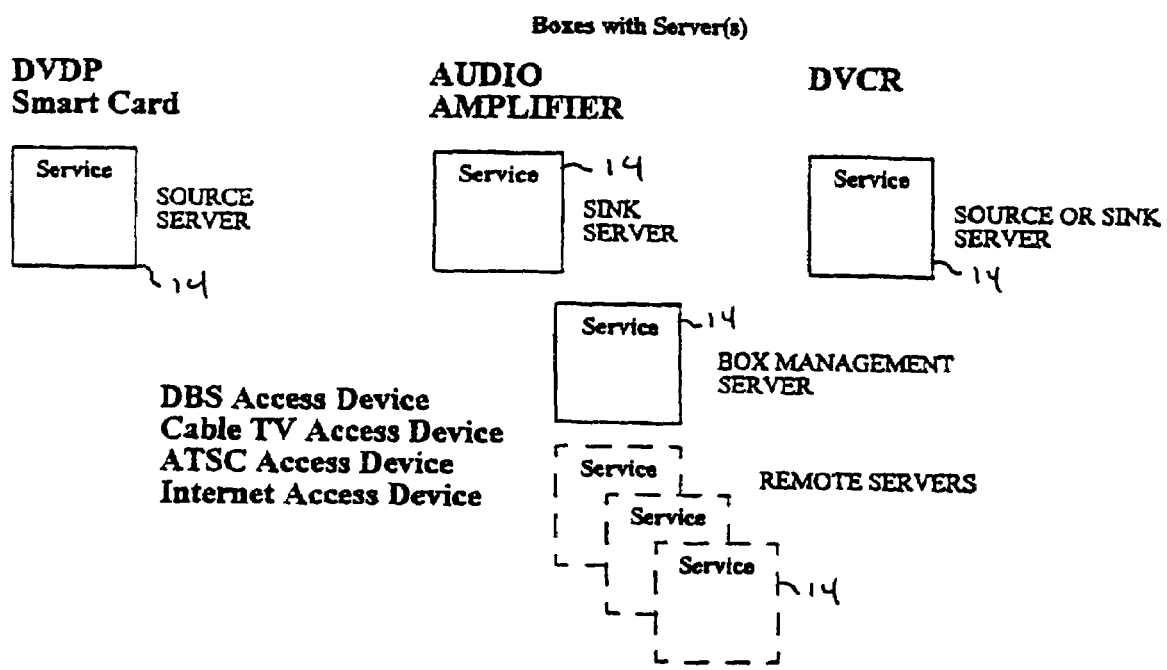
FIG. 6 shows example embodiments of server devices.

A client device 12 and a server device 14 can be physically bundled together as one unit such as a DTV. In that case, the server device 14 includes a control program 20 for controlling the server hardware, and the client device 12 provides control user interface to the server control program 20 for control and command of at least the server hardware. FIG. 5 shows examples of client devices 12 that may include: (1) a PDA(RemoteC) for displaying a GUI, (2) a DTV(STB) for displaying a GUI and including a sink server comprising audio and/or video program streak destination server, and (3) a PC for displaying a GUI and including at least one server device for providing multiple services. Hardware and executables in a DTV or PC client device can also be controlled by other client devices. FIG. 6 shows example server devices 14, including: (1) a DVDP Smart-Card as a source server device, (2) an Audio Amplifier as a sink server device, (3) a DVCR as either a source or a sink server device, and (4) a Management Server for managing remote server devices. The Management Server can be included in a DBS-STB, Cable TV-STB, or ATSC-STB, for example. Such devices include a Management Server for local control or management of the internal workings of the STB. Further, external servers accessed through an external network can be utilized by local client devices for services such as Video-on-Demand, Enhanced-TV, and Internet commerce, for example.

Referring to FIG. 7, communication and control between two server devices 14 is accomplished by the control programs 20 of the server devices 14 communicating command and control data therebetween. A server device 14 can control one or more other server devices 14 over the network. And, a server device 14 can be controlled by one or more server devices 14, and by one or more client devices 12. Further, a user can utilize a client device 12 to control and command a first set of server devices 14, and the first set of server devices 14 can automatically command and control a second set of server devices 14 without user involvement, as necessary to perform services to the user.

For example, for automatic time-delay operation, a user can "log on" to a client device 12 to control a first set of server devices 14 and specify desired services. The user then "logs off" from the client device 12. The first set of server devices 14 perform communication and control among themselves, and at a later time, one or more server devices 14 in the first set automatically control a second set of server devices 14 as necessary to collectively provide the desired services without user involvement.

FIG. 7 shows example embodiments of two server devices 14 capable of communication with, and control of, one another. Each server device 14 includes a control program 20, a clock 28 and control state data 26 described above. Each server device 14 can also include a GCO 22 for the server device 14 to be directly controlled by a client device 12. However, a GCO 22 does not need to be included in a server device 14 that is not directly controlled by a client device 12 and only communicates with other server devices 14. Each server device 14 also includes a command language (CL) interface 30 and a library of commands. The library of commands includes the commands that the server device 14 utilizes to send and receive information for providing its service. However, a command language is not necessary for user control as shown in FIG. 4 and described above.

Figure 8:
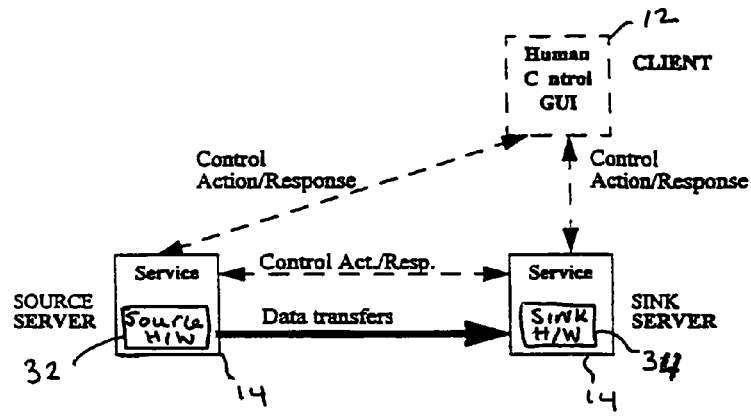
FIG. 8 shows a block diagram of an example architecture of an audio/video (A/V) model including examples of a source server device, a sink server device and a client device in a network.

FIG. 8 shows an example audio/video (A/V) model including a source server device 14, a sink server device 14 and a client device 12 in the network. The source server device 14 includes a control program 20 for controlling data stream source hardware 32 of the source server device 14, and the sink server device 14 includes a control program 20 for controlling data stream sink hardware 34 of the sink server device 14. In an example operation, a user utilizes the client device 12 to control the source server device 14 to start the data stream source hardware 32, and to control the sink server device 14 to start the data stream sink hardware 34. Upon initiation of data transfer from the data stream source hardware 32 to the data stream sink hardware 34, the user can relinquish the client device 12. Alternatively, the user can program the initiation of the data transfer for a future time and relinquish the client device 12. Thereafter, the data stream source hardware 32 of the source server device 14 and the data stream sink hardware 34 of the sink server device 14 automatically initiate the data transfer at the time programmed by the user.

For example, the data stream source hardware 32 can include a Tuner-Access Device such as a Direct Broadcast Satellite (DBS). A DBS is a multi-channel alternative to cable television and provides cable-like television programming directly from satellites on small (18 inch to 3-foot diameter) satellite dishes. With DBS, several standard analog television signals are digitally compressed onto a single satellite transponder thereby allowing up to 200 or more channels receivable with a dish pointed at a fixed position in the sky. The data stream sink hardware 34 can include a Digital Video Cassette Recorder (DVCR) which comprises s digital VCR that is able to decode compressed digital video signals on playback. The user provides command and control data including "time-delay record" event data for the DVCR and a "time-delay select a program" event data for the Tuner-Access Device. After the time-delay, the Tuner-Access Device selects the desired program, and sources program data to the DVCR which receives and records the program data without further control actions from the user.

Figure 9:
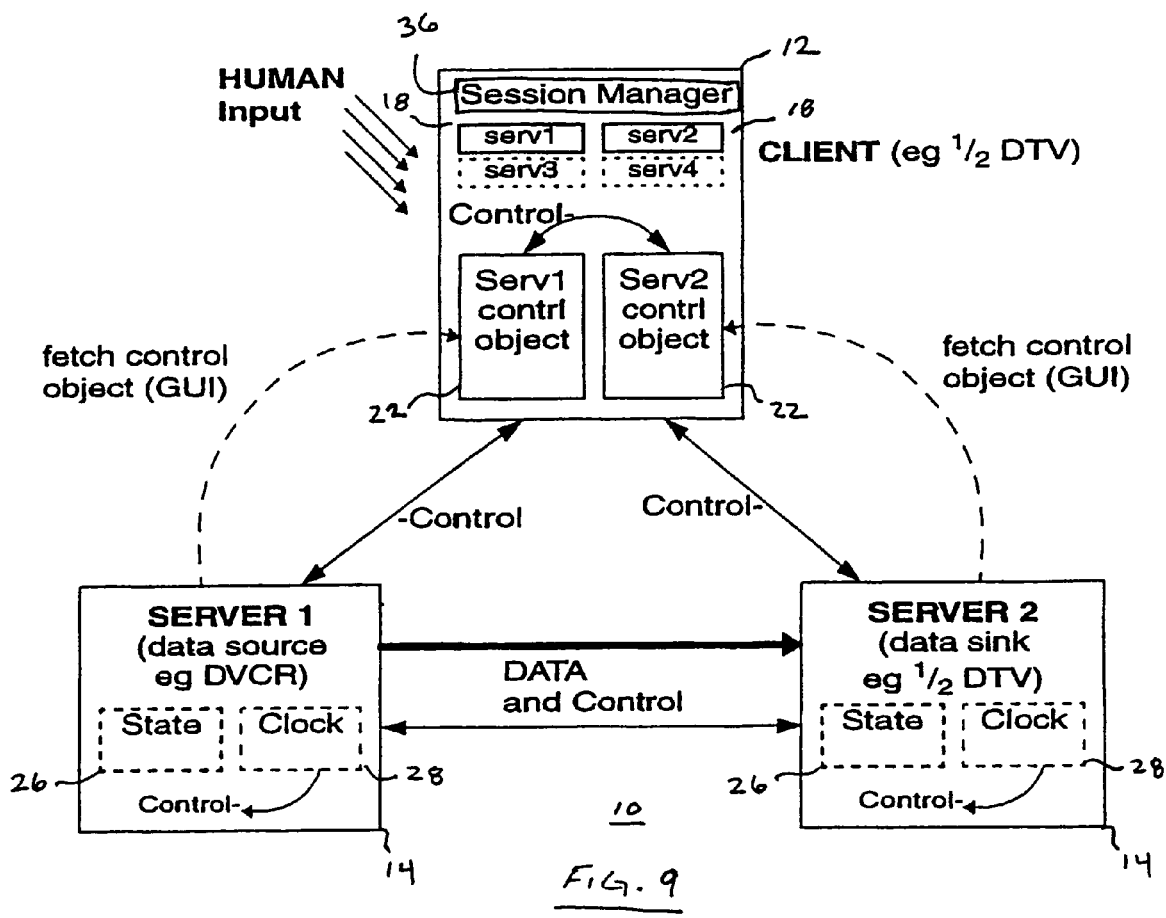
FIG. 9 shows another example audio/video (A/V) model.

FIG. 9 shows another example audio/video (A/V) model including at least a source server device 14 SERVER1, a sink server device 14 SERVER2 and a client device 12 in the network 10. The client device 12 includes a session manager 36 with a user interface for displaying selection information for a user to select and control the server devices 14 SERVER1, SERVER2 and other server devices 14 such as SERVER3 and SERVER4 (not shown). The selection information can include iconic symbols designated as Serv1, Serv2, Serv3 and Serv4 in the session manger 36 for a user to select the server devices 14 SERVER1, SERVER2, SERVER3 and SERVER4, respectively. The source sever device 14 SERVER1 can include a DVCR and the sink server device 14 SERVER2 can include a ½DTV.

In one example operation, upon selection of the server devices 14 SERVER1 and SERVER2, the client device 12 transfers the GCO 22 of each server device 14 to the client device and displays a corresponding GUI 18 for each of the server devices 14 SERVER1 and SERVER2. The user can interact with the GUI 18 of each server device 14 to provide command and control to the corresponding server device 14 for service. Each server device 14 can provide service alone or in combination with other server devices 14. Further, the session manager 36 transfers control state data 26 between the GUIs 18 of the server devices 14 in the client device 12 as necessary for the corresponding server devices 14 to perform a service. Based on the user command and control information, two or more of the server devices 14 can communicate command and control information therebetween to provide a user requested service.

The session manager 36 can include a software agent which functions to access and display available home network services provided by various server devices 14 in the network 10. The software agent can additionally match the capabilities of various server devices 14 in the network 10 and display selection information for only those server devices 14 that have compatible capabilities. Further, the session manager 36 can match the selections made in the GUI 18 of one server device 14 to the selections in GUI 18 of another server device 18 to help the user provide meaningful command and control information to the server devices 14.

In another example operation, the session manager 36 executes the software agent which searches the network and discovers the server devices 14 connected to the network. The software agent also accesses capabilities data stored in each server device 14 to determine the capabilities of the server devices 14 and provide information about those capabilities to the user. The session manager 36 then displays the selection icons Serv1, Serv2, Serv3 and Serv4 for the server devices SERVER1, SERVER2, SERVER3 and SERVER 4 as shown in FIG. 9.

The session manager 36 initially enables all the selection icons Serv1, Serv2, Serv3 and Serv4 to allow the user to select from among all four selection icons. After the user selects the server device SERVER1 by clicking on the Serv1 selection icon, the session manager 36 determines that the server devices SERVER3 and SERVER 4 are incompatible in capability with the server device SERVER1. As such, the session manager 36 disables the selection icons Serv3 and Serv 4 for server devices SERVER3 and SERVER4, respectively. The user can then click on the icon Serv2 to command and control the server device SERVER2.

As the user interacts with the GUI 18 of a selected server device 14, control and command information input by the user into each GUI 18 provide additional capabilities information which affect further server device selections by the user. For example, if a VCR server device 14 is selected, further action by the session manager 36 in enabling or disabling selection icons for other server devices 14 is affected by a user decision to play or record.

Each server device 14 in the network has one or more service capabilities as discussed above by way of example with reference to the server devices in FIG. 9. Each service capability includes sourcing or sinking of information. For example, a TV has the sinking capability of receiving video and audio streams, a VCR device can source (transmit) and sink (receive) video and audio signals, and a PC may be able to transmit and receive video, audio and data. Each sourcing capability has a complementing, and compatible, sinking capability. Similarly, each sinking capability has a complementing, and compatible, sourcing capability. For example, a video output capability of one device is complemented by a video input capability of another device.

Since each device 14 can be a source or sink for several different services on the network, each device 14 stores a capabilities data table (Capabilities Table 1) as shown by example in FIG. 10. The first column of Table 1 identifies the service capabilities of a device 14, and the second column identifies whether the device 14 is a source or a sink for a corresponding service in the first column. Using the capabilities data Table 1, new services can be implemented while maintaining compatibility with older devices. For example, if a new service is developed that is compatible with an older service, both the new and the old service can be entered into the capabilities data Table 1 for a device implementing the new service, whereby the implementing device remains compatible with older devices using the old service.

In one implementation, a Device Manager conducts a matching or comparison of device source and sink services. For example, the Device Manager can be implemented as a software agent to compare the capabilities or properties of various devices 14 and locate devices 14 with matching capabilities. For example, in a case where the service is a media stream from a first device 14 across the network to a second device 14, the Device Manager compares the capabilities of the first and second devices 14 to assist the user in making a sensible selection of the second device 14 which is compatible with the capabilities of the first device 14. The following is an example list of service capabilities for an embodiment of a server device 14:

Stream_format video_dv

Stream_format_video_mpeg2tpt

Stream_format_video_dsstpt

Stream_format_video_mpeg2pes

Stream_format_video_mpeg210801-tpt

Each device 14 can further store an attribute data table (Attribute Table 2) including pertinent attributes of the device, shown by example in FIG. 11. A name and a value define each attribute within Table 2. Though character lengths are shown in Table 2, they are not required. The attribute data is available to other devices 14 on the network 10 to facilitate interoperability and to store device information. For example, a Device Page as described below uses the Attribute Table 2 to store the device name. Other fields can be added to the attribute data Table 2 as necessary.

In the user-to-client device control model described above, attribute data can be displayed on the GUI page of the server device 14 at the client device 12. Alternatively, a second level device information home page can be utilized to display said attribute data. Further, the attribute data in the form of a text or Extensible Markup Language (XML) file can be accessed by a software agent. For the device-to-device control model, the attribute data for the controlled device is stored in the device interface application interface.

The Device Location attribute field in the Attribute Table 2 is used to store the location or group for each device 14. The Device Type attribute field specifies the device type, such as VCR, DVD, DTV, Camcorder, PC, Security System, etc. for the particular device 14. The Device Type attributes field is used to select a default device icon to represent the device within the Device Page if the device itself does not supply one. The Attribute Table 2 can include multiple entries for the Default Source and the Default Sink attributes fields. Each such entry represents a different default source or sink device 14 for each data type handled by the device 14.

Preferably, the capabilities and attributes data are packaged into structured data using a hierarchical language. This provides a common method of retrieving the capabilities and attributes data that are used for other purposes such as in GCO transfer and server device-to-server device control. As an example, the attributes data can include the following structured data format:

```
<DEVICEATTRIBUTES>
    <ATTRIBUTE name=DeviceManufacturer value="Samsung Inc.">
    <ATTRIBUTE name=Manufacturer URL value=www.samsung.com>
    <ATTRIBUTE name=ManufacturerIcon value="logo.gif">
    <ATTRIBUTE name=DeviceName value="Samsung DSS">
    <ATTRIBUTE name=DeviceModel value="SCH1900">
    <ATTRIBUTE name=DeviceType value=DDS>
    <ATTRIBUTE name=DeviceLocation value="Livingroom">
    <ATTRIBUTE name=DeviceIcon value="device.gif">
    <ATTRIBUTE name=DeviceAddress value=105.144.30.17>
</DEVICEATTRIBUTES>
```

As an example, the capabilities data can include the following structured format:

```
<DEVICECAPABILITIES>
    <CAPABILITY type=MPEG2 value=Source>
    <CAPABILITY type=MPEG2 value=Sink>
    <CAPABILITY type=MPEG3 value=Source>
    <CAPABILITY type=MPEG3 value=Sink>
</DEVICECAPABILITIES>
```

An application interface language is utilized to allow different server devices 14 to perform device-to-device control, including sever device-to-server device control. The application interface language includes command languages, and can be described using XML, as detailed below. The control program 20 of one server device 14 remotely controls the control program 20 of another server device 14 over the network, without using GUIs 18 or user involvement. An example of device-to-device control is automatic operation. A user initially provides control through a client device 12 for a desired service, and subsequently two or more server devices 14 automatically communicate and control one another without further user interaction to provide the service.

Figure 12:
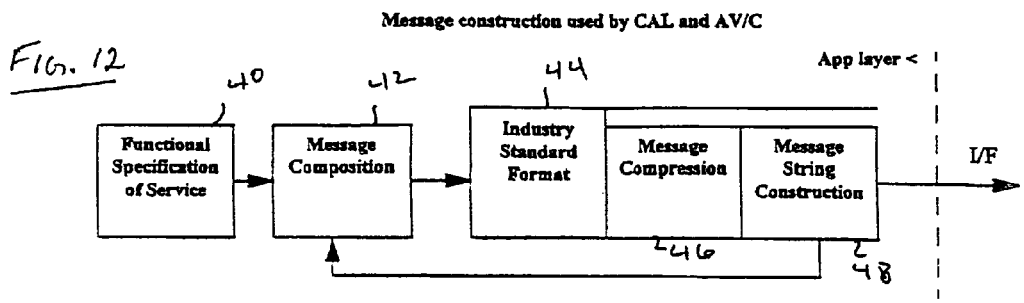
FIG. 12 shows an example configuration of building blocks for generating command messages among networked devices.
Figure 13:
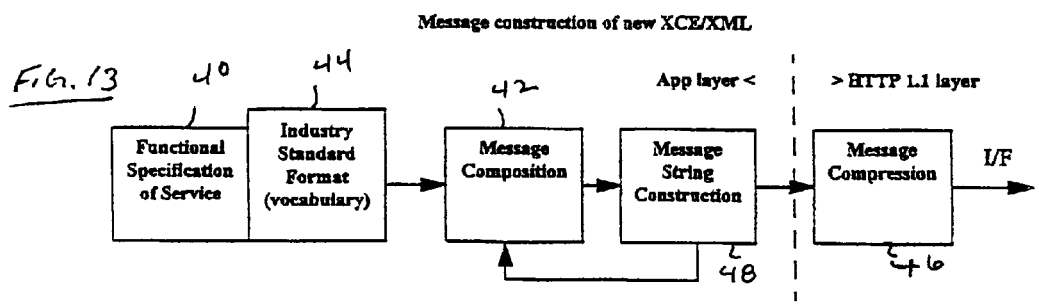
FIG. 13 shows another example configuration of the building blocks of FIG. 12 for generating command messages.

Referring to FIGS. 12 and 13, preferably a standard application interface language is utilized to allow interoperability among various control programs 20 in various server devices 14. In one embodiment, the standard application interface language includes the following building blocks: (1) functional specification of service 40 such as in a service function database, (2) a block where elements of a message are composed 42, (3) industry standard format 44, (4) message compression 46, and (5) message string construction 48 to output structured message data.

FIG. 12 shows an example configuration of the building blocks to perform the function of generating command messages. Each message item is composed from the functional specification of service and standardized by selecting an industry standardized compressed form (Hex) label for the message item. A group of such message items are assembled to create a complete command string. Existing command languages such as CAL and AV/C operate as shown in FIG. 12. However, such command language mechanisms specify binary or hex code messages and system operation on physical devices on the physical interface, and are based on hardware specifications. Therefore, such command languages may be less desirable for a network layer based control mechanism where a control system specification includes naming, addressing, device capability discovery, communication language and command messages at the application level software level, where one software application program 20 in a controller device 14 locates and controls another software application 20 program in a controlled device 14 over the network 10. Said control mechanism is more suitable for devices such as digital appliances including appliances (e.g., DVCR) as well as multi-purpose, multi-application devices such as computers.

FIG. 13 shows a preferred example configuration of the building blocks of FIG. 12 to perform the function of generating command messages. In FIG. 13, the positions of the industry standard format 44 and the message compression 46 are different than in FIG. 12. A number of textual standard forms are selected from the functional specification service 40 to make a complete message. Later the message may be compressed by a lower layer of the protocol stack. FIG. 13 represents a method of performing service or device command and control for consumer electronics (CE). Message composition can be defined by the XML standard syntax and compression can be performed by another protocol layer such as HTTP. A command interface language is utilized at the application software 20 interface level, rather than lower hardware levels. As such, the network protocol stack is governed by commands in said language, and each of a controller device 14 and controlled device 14 can be viewed as integrated components of the network for message transmission therebetween.

Figure 14:
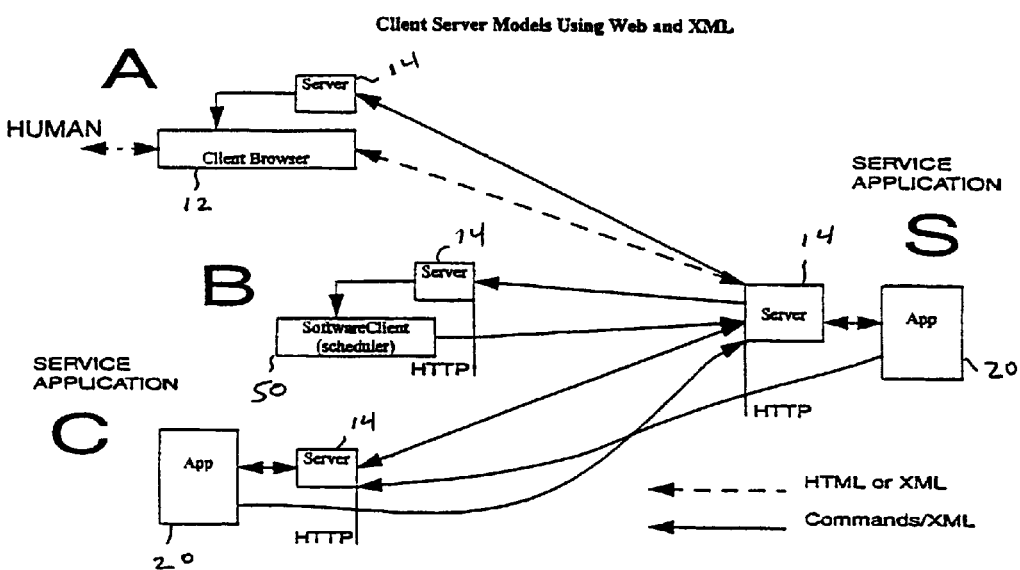
FIG. 14 shows three examples of interaction among networked client and server devices.

Referring to FIG. 14, three different instances of interaction among client devices 12 and server devices 14 are shown. In the first instance "A", a human user communicates with a remote service application "S". The user utilizes a browser in a client device 12 as the user interface, wherein the browser controls service programs 20 in the service application "S" and receives response in Hyper Text Markup Language (HTML) or XML formats. A secondary server is included with the browser to accept XML based asynchronous command message postings. For example, for a DVCR the secondary server 14 can accept command messages such as "VCR FAILED: TAPE BROKE." A software agent including a browser can be utilized to display the command messages for a user in the browser's GUI for later attention by the user and control of the DVCR. Preferably, an XML based client device 12 includes an HTTP1.1 server capability to respond to command initiated elsewhere for server device to server device command and control.

In the second instance "B", the user is replaced by a software client control program 50. The software client control program 50 generates XML based command postings to the service application "S" and receives back XML command postings. And, in the third instance "C", the software client control program 50 is replaced by an application such a server device control program 20, wherein commands and responses are exchanged between two service applications 20. In that regard, instance "B" is a special case of instance "C" with a null service.

An application interface language based on XML is used for control between a first server device 14 and a second sever device 14 (device-to-device or service-to-service) for devices or services that are world wide web (Web) enabled and Internet enabled. The application interface language is based on the Web standard, middleware layer. In one embodiment, device-to-device control includes remotely controlling the control program 20 or Application, in one server device 14 from another server device 14 in the network 10. As such, the interfaces (API) to such Applications 20 are made available over the network using API extensions. Preferably, the API extensions utilize a standard format, such as an XML-based interface, to provide overall interoperability.

Figure 15:
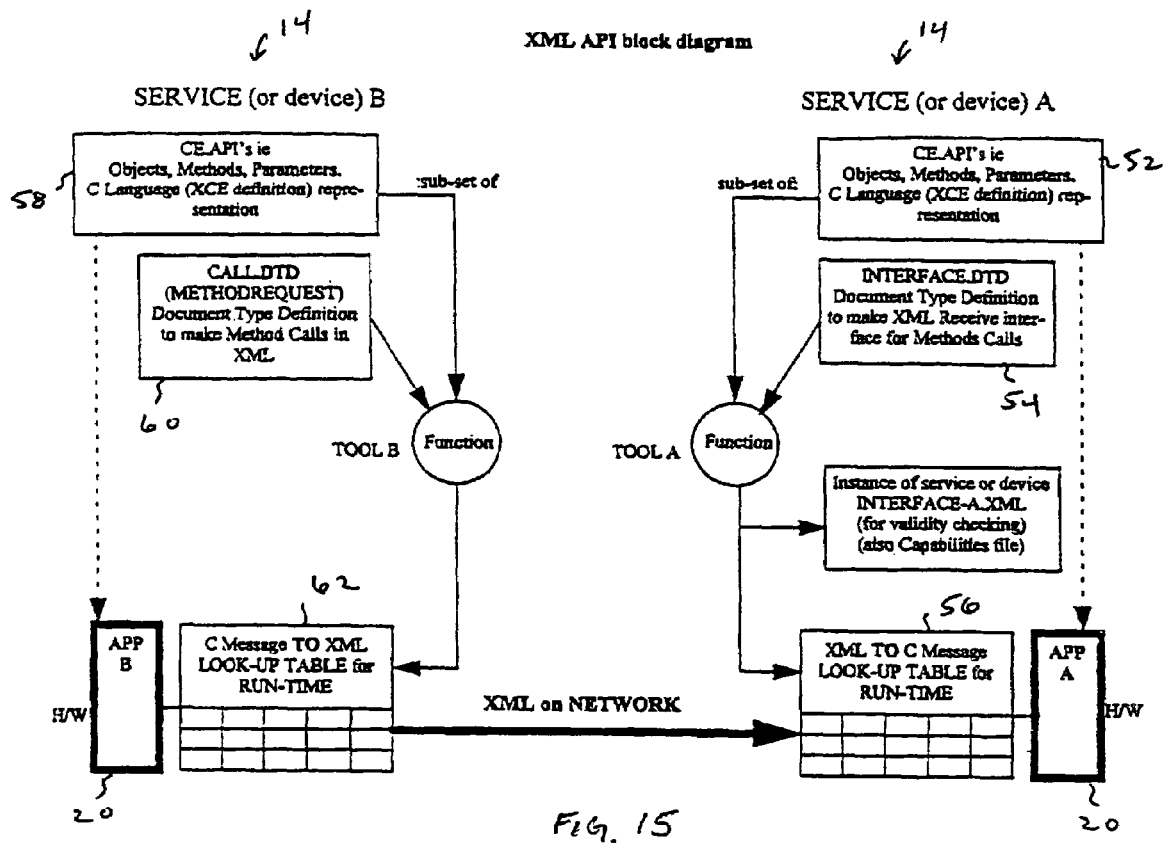
FIG. 15 shows an example block diagram for definitions of API extensions of networked device interfaces.

Referring now FIG. 15, there is shown block diagram definitions of API extensions for a first Application A, designated as Service A, and a second Application B, designated as Service B, communicating over the network 10. For example, the Service A can be the control program for a first server device A in the network, and the Service B can be the control program for a second server device B in the network. The server device B sends commands to the server device A. For this example, the first and second service devices A and B can include CE devices.

Referring to the API extensions for the Service A, the first upper-most block 52 provides a comprehensive definition or data base of CE objects and methods using English words to describe CE devices. The comprehensive definition or data base can also be in C, XML or other formats capable of representing objects and their respective methods. The comprehensive definition or data base utilizing XML is termed XCE definition. The second block 54 provides a format for representation of an API in XML form for all devices 14, designated as an interface data type definition INTERFACE.DTD.

A software agent, designated as Tool A, utilizes a subset of the XCE definition for Service A, and uses the interface data type INTERFACE.DTD for Service A to create an XML form document, INTERFACE-A.XML. The document INTERFACE-A.XML describes the objects and methods supported by the Service A according to the document type definition INTERFACE.DTD for Service A. Other data type definitions can also be used to create the INTERFACE-A.XML document.

The software Tool A also creates a look-up table 56 to convert from XML messages from Service B on the network interface, to API definitions for Service A, programmed in C for example, and complied to executable binary. Preferably, the look-up table 56 is created at compile time, whereby during run-time, incoming XML form method messages (commands) from Service B are converted to the API format created by the complied application C code for Service A. The look-up 56 table provides run-time translation of XML object method calls from Service B into device native language calls for Service A. The look-up table 56 is complied with the device control program 20 for local execution on the server device A for Service A.

The INTERFACE-A.XML can be used by Service A for validity checks if it encounters an error in a received message. The INTERFACE-A.XML can also be used by a foreign Application such as Service B to determine the message format for Service A before communicating with Service A. Further, if a message from Service B to Service A causes an error, Service B can access the INTERFACE-A.XML document to diagnose the error.

Referring to the API extensions for the Service B, the first block 58 provides a comprehensive definition or data base of CE objects such as the XCE definition for Service A above. The next block 60 provides a language definition for making XML form method (command) calls to remote API services or devices such as the API for Service A. The language definition is a document type definition Method Request CALL.DTD which describes interaction with objects on the network.

A software agent, designated as Tool B, utilizes at least a subset of the objects and methods in the XCE definition for Service B and the CALL.DTD document, to generate a look-up table 62 for converting commands from a complied C program code for Service B into XML form method requests. As such, the look-up table 62 provides conversion between a method invoked by Service B (e.g., "PLAY") and the XML document or message that carries the method call across the network interface to Service A, for example. The subset of the XCE definition used by software Tool B depends on the extent and nature of use of the network. For example, the subset can be selected to provide global or restricted use of all available services on a home network.

Therefore, the API extensions provide for communication between various devices on the network using XML. In the example above, the program code 20 for Service B generates method calls to an API, and the API calls are converted to XML form to comply with the Web/Internet standard XML for inter-device communication. The XML method calls (messages) are sent to Service A over the network, and Service A reconverts the XML method calls from the network interface to program code API definitions for Service A. This conversion and re-conversion provides Web/Internet compatibility for diverse devices in the network with program code APIs which would otherwise require binary compatibility between different devices. Appendix 1 shows examples of the XML interface blocks utilizing the block diagrams in of FIG. 15.

Further, Appendix 1 provides examples of interface definitions INTERFACE.DTD and CALL.DTD used to create description documents of available services, INTERFACE.XML, described above. The CALL.DTD definition includes a rule set for generating method call or function call message such as XML Remote Procedure Call (RPC) or XMLRPC messages. The CALL.DTD definition describes an output interface of a controller service 14. In a home network, for example, INTERFACE.XML represents the services available on the home network. The available services are a subset of the entire services in the CE space.

In a One-Touch-Record (OTR) scenario, a user is in control of a Tuner-Access-Device such as a Satellite STB. The user controls the tuning using an Electronic Program Guide (EPG) such as a graphical user interface representation of program listings. OTR record provides the user with a service including selection of a future program from the EPG for recording without the user accessing the VCR graphical user interface to program the VCR for a Time Delayed Recording. OTR automates the control of the VCR. Below is an example control list of actions in OTR.XML shown in Appendix 2: (1) StreamOpen=play the selected program stream output to the network from a Satellite STB; for OTR this control is local to the STB device; (2) StorageOpen=open a storage service; and (3) StorageRecord=Send the Record command across the network to the VCR.

Figure 16:
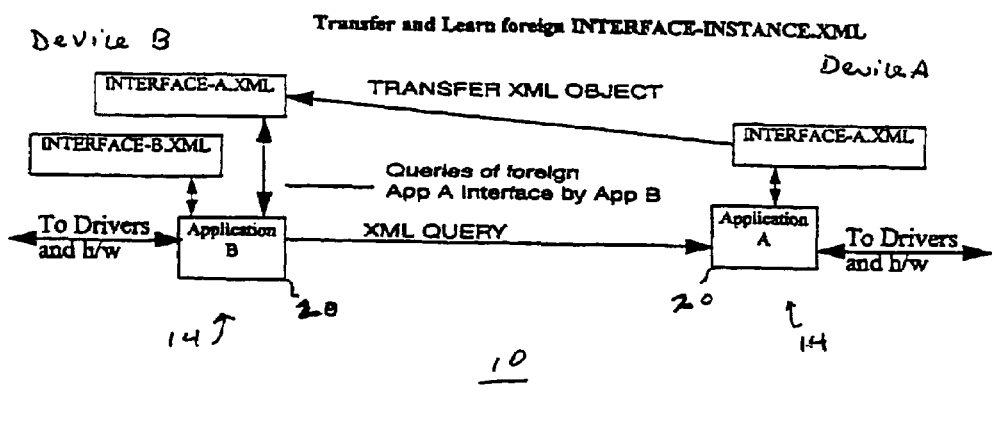
FIG. 16 shows an example architecture for a server device application accessing the interface description document of another server device.

As discussed above in relation to FIG. 15, a first device B can access the INTERFACE.XML document of a second device A to examine the device capabilities and API interface details of the second device A and determine supported functionality and command details of the second device A. In particular, the first device B can determine overlapping, and therefore useable, methods supported by first device B and the second device A. FIG. 16 shows an example wherein a first server device B including an Application B accesses the INTERFACE-A.XML document of a second server device A including an Application A. The first server device B includes a INTERFACE-B.XML document for comparison with that of a INTERFACE-A.XML document in the second server device A.

In one scenario, the first server device B wishes to control the second sever device A in the network. The INTERFACE-A.XML document of the second device A is transferred from the second server device A to the first server device B and used by Application B to query the capabilities and API interface methods of the second server device A. This allows the first server device B to control the second server device A utilizing XML remote procedure calls XMLRPC. In another scenario, the first server device B performs the above steps after attempting to communicate with the second server device A at least once, and failed to establish communication. Yet in another scenario the first server device B queries the INTERFACE-A.XML document in the second server device A remotely without transferring the INTERFACE-A.XML document to the first server device B.

Upon examining the contents of the INTERFACE-A.XML document, the first server device B can create commands for sending to the second server device A in XML format as described above. Generally, the first server device B can interpret at least a portion of the contents of the INTERFACE-A.XML document that overlaps with a subset of the XCE definition used by the first and second server devices B and A as described above. If the first server device B is unable to interpret a portion of the contents of the INTERFACE-A.XML document, then the first server device B can ignore that portion, or fetch an application to assist it in interpreting that portion, by translation as described further below.

Referring to FIG. 17, another example device-to-device or inter-device control between a controller server device 14 and a controlled server device 14 is shown. The controller device 14 includes a controller application E and the controlled device 14 includes an application executable C. The controlled device 14 further includes INTERFACE-A.XML, the application interface description A of the application C. Application E accesses the application interface description A in the controlled device 14 to query the capabilities and API interface methods of the controlled server device 14. Application E then commands and controls application C using XML remote procedure calls to control hardware or service D of the controlled device 14. A scheduler device can be a case of a controller device 14, driven by time of day such as Time-Delay-Record controller in a VCR.

In a first example, the application E accesses the application interface description A by remote query over the network. In a second example, the application E accesses the application interface description A by transferring a copy of the application interface description A from the controlled device 14 to the controller device 14. The application E then queries the interface description A locally. In a third example, the application interface description A is transferred to a library device 64 which provides library space for interface descriptions, and the application E remotely queries the interface description A in the library. The library device 64 stored the address (URI) of the associated applications available for direct control action and responses.

Referring to FIG. 18, the XML protocol provides a Web standard common middleware layer in a communication stack 66 at the API level between applications 20 of various devices 14 in the network. In each device 14, applications at the top of the communication stack send and receive communication messages over the network, and communicate with software layers in the device stack that locally control the device hardware or service software for the device.

A first XML layer API, designated as XML Layer OUT 68, is used for sending messages, and a second XML layer API, designated as XML Layer IN 70, is used for receiving messages. The XCE definition and the XML definition of a method call, namely the document type definition CALL-.DTD described above, are used to create the XML Layer OUT 68. Further the XCE definition and the XML definition for a method call, namely document type definition INTERFACE.DTD described above, are used to create the XML Layer IN 70. For example a controller application utilizes the XML Layer OUT 68 and a controlled application utilizes the XML Layer IN 70.

Figure 19:
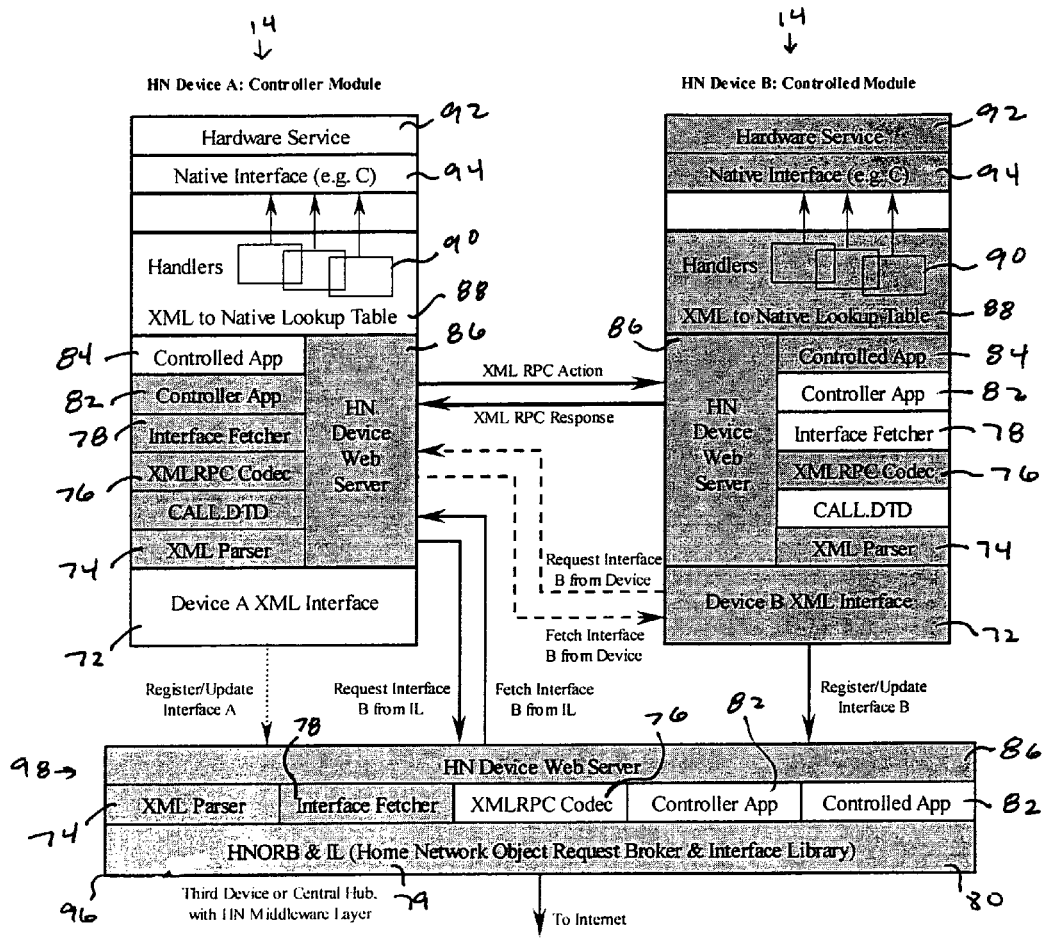
FIG. 19 shows another embodiment of server device to server device command and control architecture.

Referring to FIG. 19, another embodiment of server device-to-server device command and control architecture is shown. An XML-based control architecture is utilized for device-to-device (service to service) control for Web and Internet enabled devices or services. A first device A can remotely control an application 20 in a second device B over the network using XML command messages. The interface to each device includes interfaces to the applications in the device, and is described in XML format. Said interfaces can be extended and made available on the middleware layer for retrieval and interpretation by other devices over the network, as described further below.

Each of the server devices A and B includes hardware and software for controlling other server devices over the network and for being controlled by other server devices over the network. In FIG. 19, the home network device A is a controller device or module, and the home network device B is a controlled device or module. Each of the devices A and B includes a local Device XML Interface 72 comprising an interface document INTERFACE.XML and a document type definition INTERFACE.DTD. The INTERFACE.XML document includes a description of the objects, methods and parameters supported by the corresponding device 14. The INTERFACE.DTD document can be used for validity checks specific to the XML interface of the device, as described above.

Each of the devices A and B also includes an XML parser 74, comprising program code for parsing and validating XML messages, such as XML interface and XMLRPC commands. The XML parser 74 is similar to said XML Layer IN 70 described above with reference to FIG. 18. Further, each of the devices A and B includes an XMLRPC encoder and decoder (codec) 76 for encoding method names and parameters of an outgoing call in an XMLRPC message, and for decoding an incoming XMLRPC message after it is parsed, to retrieve the method name and parameters therein. The XMLRPC codec 76 is independent of the device XML interface 72 and of the device-to-device control architecture, thereby allowing use of different XMLRPC formats without changing other aspect of the device to device control architecture.

An Interface Fetcher comprising program code, is utilized by each of the devices A and B to fetch the device interface of another device directly from another device or from a home network Interface Library 80. When a device 14 is a controller device, a controller application program code 82 in the controller device 14 effects command and control of other devices 14 over the network, by supervising software and hardware in the controller device 14 such as the XML parser 74, the interface fetcher 78 and the XMLRPC codec 76. When a device 14 is a controlled device, a controlled application program code 84 in the controlled device 14 supervises software and hardware in the device 14 for the device 14 to be controlled by other devices 14. A Home Network Device Web server 86 in each of the devices A and B manages communication between the devices over the network. An XML to Native Lookup Table 88 in each of the devices A and B is used by the controlled application 84 to convert information in XMLRPC messages (e.g., method name, parameters name and type) to native interface of the device (e.g., native method name, parameters name and type). Said table 88 is not used when the names of methods and parameters in XML messages and the native interface of the device are the same.

Each of device the devices A and B further includes one or more Handlers 90, wherein each Handler 90 includes a pointer from within the controlled application 84 to a native implementation of one specific device functionality. In most devices, native implementations of device functionality include binary code at run-time. The binary code can be generated from higher level languages at compile time, including C and Java, for example. As such, consumer electronics manufacturers can add more Handlers 90 for new functions without affecting existing Handlers and function implementations. A hardware service 92 in each of the devices A and B includes native implementations of device functions. Each of the devices A and B also includes a Native Interface 94 which comprises the API of native implementation of the device functions.

Further, a Network Object Request Broker such as a Home Network Object Request Broker (HNORB) 79 and Interface Library (IL) 80 provides a middleware layer 98 for the home network 10. As shown in FIG. 19, the middleware layer 98 can be located in a third device 96 or in a separate control hub. The HNORB 79 includes a software agent for use by one device 14 to discover the existence of other devices 14 connected to the network 10. The HNORB software agent organizes device names into a naming hierarchical tree structure, organizes device interfaces into said searchable Interface Library, and provides device interfaces to a device requesting interface information.

The middleware layer, comprising the HNORB 79 and the IL 80, can be connected directly to the Internet, such that selected home devices can be accessed from outside of a local home network 10. The middleware layer 98 in one local home network can be connected to the middleware layer 98 in other local home networks over the Internet to provide an integrated network comprising two home networks 10. In that case, authorized users with the appropriate stream encryption can access a DVD changer in the user's primary home, from a TV in the user's secondary home to play a video and view it on the TV.

To use the Interface Library 80, at least one HNORB&IL should be running on the local home network 10. More than one HNORB&IL may also be available. For example, a cable modem, several DTVs, and a central home hub can all have their own HNORB&IL software agents. To locate the HNORB&IL, a device 14 sends a broadcast message over the local home network. The first HNORB&IL to respond to the device 14 is utilized by the device 14. Once a HNORB&IL is located, the device 14 and the HNORB&IL can establish a point-to-point Transmission Control Protocol (TCP) or User Datagram Protocol (UDP) connection for registration, interface request and fetch, and device lookup services. If a UDP protocol is not available, a TCP protocol can be used for high bandwidth connections such as IEEE 1394. HTTP-based XMLRPC can also be utilized for device to HNORB&IL communications. For example, a device 14 can remotely call a "register" method of HNORB to pass the device interface as one or more parameters, or, a XMLRPC call can retrieve a partial or entire device interface from the IL as a XMLRPC response or return value.

As aforementioned, more than one HNORB&ILs can run in a local home network 10 simultaneously, wherein each HNORB&IL recognizes a subset of available devices and one HNORB&IL can communicate with other HNORB&ILs to locate the devices 14 it can not find. Multiple HNORB&ILs on one local home network 10 can locate each other automatically by using broadcasting messages, such as UDP or TCP. In this case, multiple HNORBs construct a distributed object request broker, while multiple Interface Libraries 80 construct a distributed interface library. To provide fault tolerance, if one of the HNORB&IL should terminate unexpectedly, all devices registered with this HNORB&IL are notified and said devices can automatically register with another available HNORB&IL.

Each device interface has an associated consistent, unique logical name. Other devices can use said consistent, unique, logical name to recognize and access a device, even after said device's location or real network address has changed. The mapping of the logical names and real device addresses are handled by a software agent for naming service in HNORB. Preferably, a standardized naming method is utilized. More preferably, a hierarchical naming structure is used to organize device names into a hierarchical tree. This hierarchical structure can be expressed using "/", similar to that in a file system. The structure can be generated by different methods, such as by different service types as a home/MPEG2/TV; or by different locations, such as home/livingroom/VCR. Several naming trees may coexist for performance and efficiency.

In the example command and control between the controller server device A and the controller server device B in FIG. 19, the middleware layer 98 is in the third device 96 or can be in a separate central hub. The grayed blocks show the device elements used for the specific command and control process depicted in FIG. 19. In an example operation scenario, after the devices A and B become available and accessible over the network, each device registers/submits itself and its XML interface to the central HNORB and IL middleware layer 98. If a central HNORB and IL middleware layer is not available, then each device broadcasts a message over the local home network to announce itself.

The controller application 82 of the device A attempts to query all or part of the device interface of the controlled device B. If an Interface Library 80 is not available, the controller device A can request and fetch the device interface of the controlled device B directly from the controller device B by first sending a request to device B over the network, and then receiving the XML interface of device B from the device B. However, if an Interface Library 80 is available, the controller device A can request all or part of the device interface of the controlled device B from the Interface Library 80. The software agent of HNORB obtains the XML device interface of the device B from the Interface Library 80 structure and sends it back to the controller device A.

Once the controller device A receives the XML device interface of the controlled device B, the controller application of device A uses the XML parser 74 of device A to parse and interpret the device interface of the device B. The XMLRPC codec 76 of device A then generates desired XMLRPC command messages using the parser results. The XMLRPC command messages are sent to the controlled device B over the network. Upon receiving said XMLRPC command messages, the controlled application 84 of device B uses the XML parser 74 of device B to parse and interpret the received XML command messages. The XMLRPC codec 76 of device B then decodes the parser results to obtain the method call information in the command message, including a method name and parameters for the device B functions to perform requested services.

The controlled application 84 of device B then uses the XML to Native Lookup Table 88 and Handlers 90 in the device B to access and launch the native function implementations of device B through the native interface of device B. If a function generates any responses or return values, said responses or return values are encoded into XML or XMLRPC messages and sent to the controller device A. Further, the middleware layer HNORB and IL can provide the controller device A with a reference to the controlled device B, whereby the device A can generate remote calls to the device B native functions just as calls to the local device A native function.

Preferably, a standard XMLRPC format is utilized so that all devices can interpret and decode RPC calls over the network. Because the device interface of a controlled device 14 can be queried and examined by a controller device 14, preferably a simplified XMLRPC format with sufficient device interface information is utilized to improve efficiency. The following example shows two possible formats of XMLRPC calls for One Touch Record (OTR) and Time Delayed Record (TDR) operations.

EXAMPLE I

XML RPC call, example format including detailed tag and interface information:

1. Example of OTR call:

```
<?xml version="1.0"?>
<call>
    <object>DVCR1.record</object>
    <method>timeDelayedRecod</method>
    <parameters>
<parameter>
            <name>channel</name>
            <value><int>4</int></value>
    </parameter>
    <parameter>
            <name>recordTime</name>
            <value><time>2:10:30</time></value>
    </parameter>
    </parameters>
</call>
```

2. Example of TDR call:

```
<?xml version="1.0"?>
<call>
    <object>DVCR1.record</object>
    <method>oneTouchRecod</method>
    <parameters>
<parameter>
            <name>channel</name>
            <value><channelName>NBC</channelName></value>
    </parameter>
    <parameter>
            <name>startTime</name>
            <value><datetime.iso8601>19990401T19:05:35</datetime.iso8601></value>
    </parameter>
    <parameter>
            <name>recordTime</name>
            <value><time>2:00:00</time></value>
```

-continued

```
</parameter>
    </parameters>
</call>
```

EXAMPLE II

XML RPC call, example format with reduced tags and interface information:
1. Example of OTR call:

```
<?xml version="1.0"?>
<call>
    <object>DVCR1.record</object>
    <method>timeDelayedRecod</method>
        <parameter value="4">channel</parameter>
        <parameter value="2:10:30">recordTime </parameter>
</call>
```

2. Example of TDR call:

```
<?xml version="1.0"?>
<call>
    <object>DVCR1.record</object>
    <method>oneTouchRecod</method>
        <parameter value="NBC">channel</parameter>
        <parameter
        value="19990401T19:05:35">startTime</parameter>
        <parameter value="2:00:00">recordTime</parameter>
</call>
```

Figure 20:
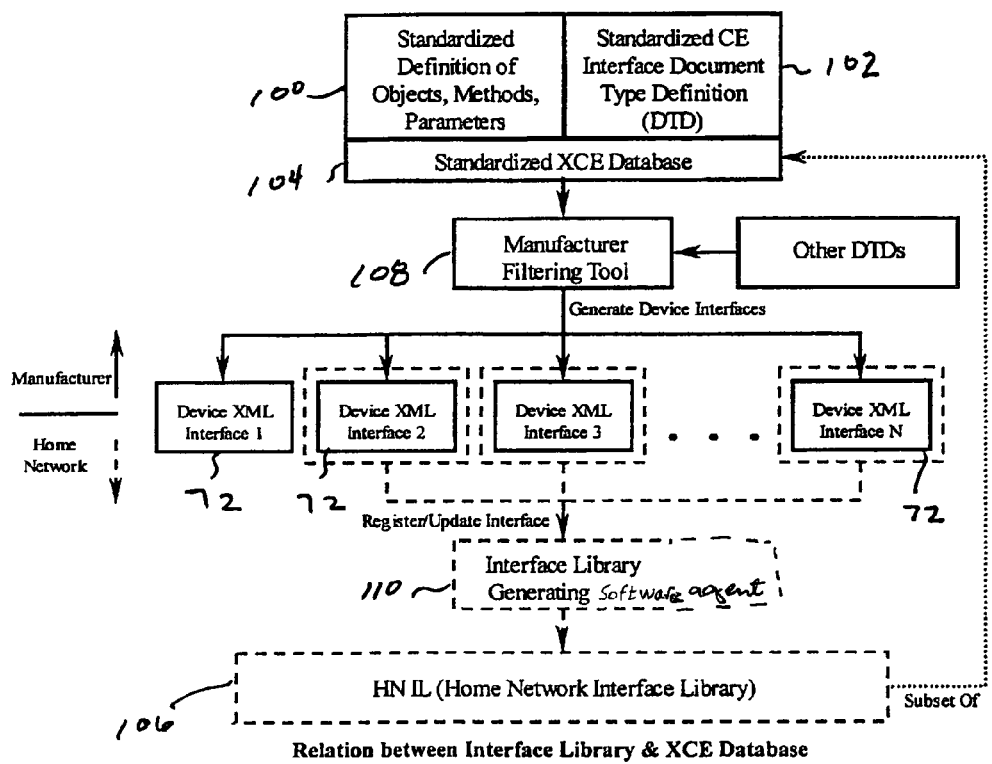
FIG. 20 shows the relationship between a device interface library and consumer electronics definition data base for home devices.

Referring to FIG. 20, device interfaces for home devices 14 are based on an industry standard structured data base 100 using standardized vocabulary. Interface data for new interfaces and vocabulary can be added to the data base 100. A comprehensive definition or database of CE objects, methods and parameters using English words to describe all CE devices is termed a CE data base 102. The comprehensive definition or database can be in C, XML or other formats capable of representing objects and their respective methods and parameters. The comprehensive definition or database utilizing standardized XML vocabularies is termed XCE definition or data base 104.

Controller and controlled applications 82, 84 are programmed using a standard interface subset of the XML based XCE data base 104. Each device interface is stored with said applications 82, 84 in XML form. Although the XCE data base 104 need not be in XML, said subset interface produced at compile time is in XML in an embodiment of the invention, as described above in reference to FIG. 15.

In FIG. 20, for embedded appliances 14, the information designated as 'Manufacturer' information is built-in to the appliances 14 at manufacture time, and the information designated as 'Home Network' is part of the operational run time aspects of the appliance in the network. Device XML interfaces 72 designated as 1 . . . N for N devices 14, are branches of the data in a standardized XCE data base 104. A Home Network Interface Library (HNIL) 106 provides a collection of the device interfaces of available devices 14 connected to the home network. The Home Network Interface Library 106 is a subset of the totality of the XCE data base 104.

In FIG. 16, a device interface was transferred from a device A to a device B for an Application B in device B to examine the contents of the interface for the device A. As detailed above, a device interface includes a description of the objects, methods, parameters supported by a device, and is referred to as INTERFACE-A.XML for a device A for example. A Device XML interface 72 is a device interface in XML format. The content of the XCE data base 104 is a service oriented structure which provides device interfaces.

Referring to FIG. 20, the XCE database 104 also includes a standardized XCE Interface Document Type Definition (DTD) for CE devices, which provides a standardized set of rules for using XML to represent CE devices 14. The DTD or its subsets can be used for validity checks. A software agent designated as Manufacturer Tool 108, filters and utilizes a subset of the standardized XCE definition 104 for a specific CE device, and uses the standardized XCE Interface DTD to generate an XML device interface 72 of the CE device, for example INTERFACE.XML and INTERFACE.DTD. The document INTERFACE.XML includes a description of the objects, methods and parameters supported by a specific device according to the standardized XCE Interface DTD. The document INTERFACE.DTD is a subset of the standardized XCE Interface DTD, and can be used for validity check for the XML interface of the device. Other document type definitions can also be used to create the INTERFACE.XML document.

The XML interfaces 72 of the CE devices, including said XML interface document and said DTD document, are stored in a universally accessible library such as the home network Interface Library 106. A software agent 110 collects the device interfaces 72 of all accessible devices 14 over the network and places them into the searchable structured Interface Library 106 along with the device name/address information. The Interface Library 106 is a subset of the XCE database 104 and the process of generating the Interface Library 106 is similar to that of rebuilding part or all of the XCE database 104. The Interface Library 106 can function as a collection of device interfaces 72 of all devices 14 in the home network, or as a cache depending on availability of storage space, wherein only the most recently used device interfaces 72 are stored therein. In cases where a device 14 updates its device interface 72 due to an event, such as disk change in a DVD player, part of the device interface 72 is updated based on an event service.

Figure 21:
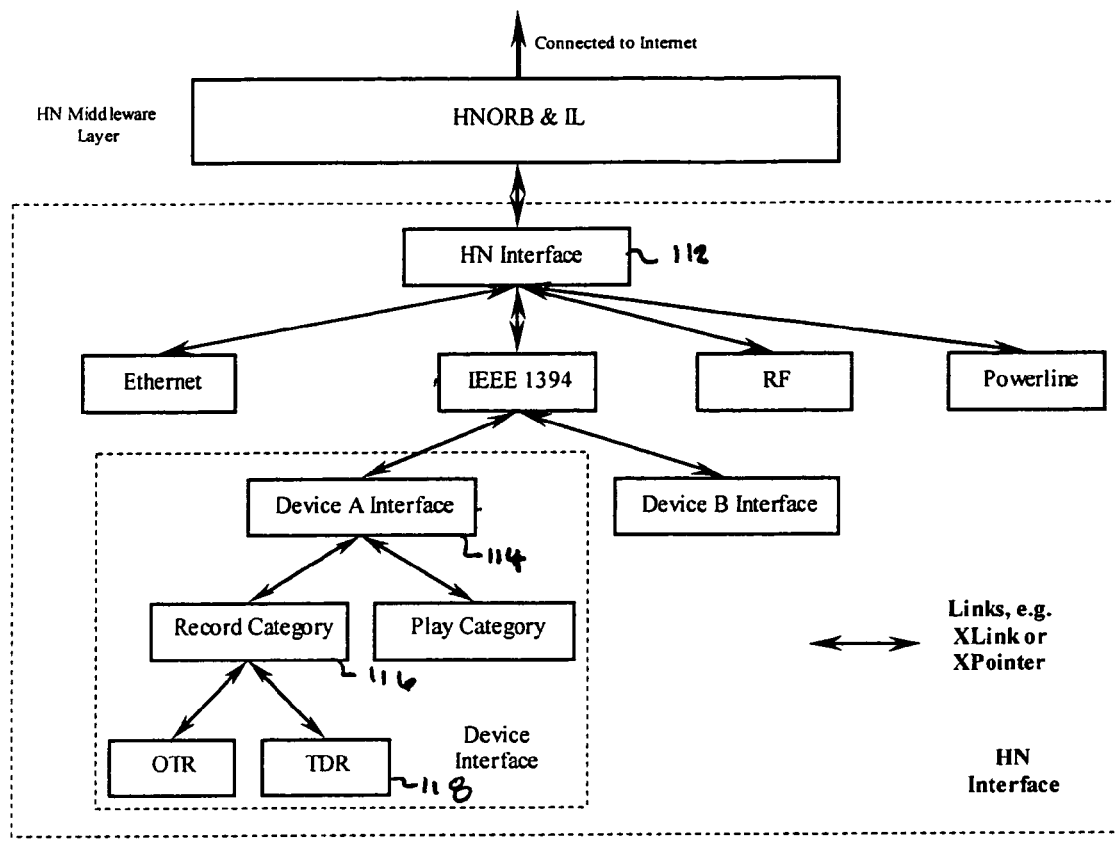
FIG. 21 shows hierarchal form of an embodiment of a device interface definition.

Referring to FIG. 21, preferably the device interface definition 72 of each device 14 has a hierarchical form. This is because for a home device 14, the device interface definition 72 can be lengthy. Typically, one or few functions such as a single function for Time Delayed Recording, are accessed at a time, and therefore only a small portion of the device interface 72 is used. Rather than rendering the entire device interface 72, it is more efficient to render only a portion of he device interface 72. By using hierarchical device XML interface, a controller device 14 can request partial device interface 72 of a controlled device 14 by specifying the desired function categories or functions in a request for the XML device interface from the controlled device 14 or from the HNORB and IL middleware layer 98. In the latter case, the HNORB and IL middleware layer 98 sends back the desired portion of the device interface 72.

Referring to FIG. 21, the hierarchical device interface structure can include four layers, including: (1) a first layer 112 for XML interface of each home network, listing current available devices, (2) a second layer 114 for general XML interfaces of each device, listing function categories, (3) a third layer 116 for specific XML interface of each function category for a device, and (4) a fourth layer 118 for specific XML interface of each function in a function category. Inside the home network, only the three lower layers 114, 116 and 118 are utilized, and outside the home network the first layer 112 is utilized.

FIG. 22 shows said layers 112, 114, 116, 118 and corresponding interface examples. The interface in each layer is linked to upper or lower layer (if available) through links such as XLink or XPointer, which provide two-way linking. XLink includes a package of hyperlinking functionality that has two parts: (1) an XLink component which allows links in an XML documents to be recognized as such, and (2) an XPointer component which allows links to address into precise sub-parts of an XML document. As such, XLink governs how links are inserted into XML documents, wherein the link may point to data such as a GIF file. Further, XPointer governs a fragment identifier that can go on a URL when linking to an XML document, from anywhere (e.g., from an HTML file).

In a typical command and control model for a server device 14 to control another server device 14 according to the present invention, a first device 14 attempts to query the device interface of a second device 14 at the second interface layer 114. After selecting function categories (FC), the first device 14 queries the interface layer 116 of a specific function category in the second device 14, such as Record Category. Further, the first device 14 can query the interface layer 118 of a specific function, such as OTR or TDR, to make calls to said functions. The hierarchical or tree structure makes finding of an interface function more efficient and saves network bandwidth. An example interface file structure and layers can be:

First layer 112—HN1.xml
    Second layer 114—VCR1.xml
    Third layer 116—VCR1_RecordCategory.xml
    Fourth layer 118—VCR1_RecordCategory_OTR.xml Similarly, the home network Interface Library 106 is preferably hierarchical and can be structured in a variety of ways such as by different service type of devices or by different locations such as rooms. Said hierarchical structure is the interface of a local home network 10 to other home networks or the Internet.

Appendix 5 shows an example hierarchical device interface definition 72 which can be implemented in XML syntax. Said hierarchical device interface definition 72 can include the following fields:

- 'document file' name, provides name of the document type definition (DTD) file that can be used by an XML parser 74 for verification of legality and correctness of the XCE database 104 or part of the XML version of the XCE database 104. There can be several DTD files for different parts of the XCE structure, wherein said DTDs are different from the document type definitions for the RPC.CALL and INTERFACE.DTD for communication.
- 'doc' name, provides the top level name of the area of coverage of capabilities, attributes, communication and control interface.
- 'Services_home', provides area for home automation, consumer electronics, utility, etc.
- 'Server_auto', for an automobile in the garage and shows message interface available for one or more automobile types. For example, server_auto_ford_explorer_98' is the interface for a particular automobile. This allows access to mileage and maintenance interfaces of the automobile, and can also be used for remote access by an automobile manufacturer or garage for direct checking and remote diagnostics, for example.
- 'server_samsung_web_site', provides for communicating with a manufacturer Web site outside the home. Includes interface for message, service, help, etc.
- 'AVC_commands' and 'CAL_commands', provides for legacy devices capable of interpreting AV/C and CAL languages, for example. This portion of the structure identifies commands in said languages, where the commands are tagged and carried in XML. As such, the contents are not XCE (Web) objects, and protocol converter applications can be utilized to interface to the original CAL or AV/C application software.

In the above description, 'Services_home' provides the main structure including A/V consumer electronics. A branch of the structure is expanded in detail for a particular example of a video services sink, and stream destination (e.g., DVCR) control interface. The control interfaces in a typical home network can include:

- 'xml_utility', provides details for supporting utility network functions such as downloading an updated DTD file, interface file, program file, etc.
- 'client', describes the interface details of a client device 12 including a Web browser. For example 'acknowledgment' indicates the controller's acceptance of acknowledgment of a message or command sent out.
- 'server_av', provides control and capacity interfaces for all audio and video services available, including STB, DVCR, DTV, DVD, AUDIO, etc.
- 'lighting', provides an interface to a home automation lighting controller, and includes sensors, lights, etc.
- 'comms', provides control interfaces to communications devices, typically for utility purposes or remote management of the devices' set-up or parameters, or for restoring configurations.
- 'hvac', provides interfaces for remote control of the HVAC system, and can be used for control of said system from outside the home by the utility company, for example, to turn the home's HVAC system off during peak load periods of the day. Further, said interface can be used for controlling the HVAC system from within the home, by an appliance for device based controller to provide a more sophisticated control mechanism than thermostat control.
- 'utility', provides interface for reading utility meters for the home, for example.
- 'security', provides interface for security sensors and alarm settings. As such, using the interface, applications running on a home network device can have access to the sensor and detector devices around the home for monitoring and controlling of the those devices.
- 'appliances', provides interfaces for kitchen, utility and general home appliances, including, for example, providing remote control or monitoring temperature settings or other controls and parameters from a controller device. In one scenario, a microwave appliance can scan bar code information on the packaging of a food item and access a manufacturer database to obtain cooking time of the food for a given microwave system type. Such integration of appliances using device to device command and control provides many control scenarios for providing services such as automatically pausing a dishwasher and muting a TV when a phone is picked up in the kitchen or family room.

'convenience', provides interfaces to devices for providing convenience services such as interface to a curtain, window, blinds or whirlpool controllers, for example.

In the above description, 'server_av' is part of the structure for the control interfaces for A/V appliances offering A/V stream service, and is subdivided into 'controls-gen', 'source' and 'sink' capabilities.

'controls-gen', provides interface for device manufacturer attributes and general utility interfacing such as ping testing the presence of the device. Further, manufactured-in attributes such as software and hardware identification and version information can also be included. A device supplying this interface returns data providing name or identification for said software without effecting any control actions. An interface to set the time of day clock can also be included.

'sink', provides interface for the media stream service devices. The structure is organized based on service offered (i.e. video stream record and replay) rather than particular device names such as VCR. For example, a Tuner and a DVD player are both video program stream sources for the network with video program formats, and can be controlled, such as started and stopped. Differences in control of particular devices are addressed by the lower layers of the definition structure.

'source' provides interface similar to the 'sink' interface.

Referenced above, 'service_id' or 'application_interface_id' includes the name, address or Web address or URL location of one or more devices 14. Because the XCE database 104 comprises the totality of agreed upon interfaces, typically a Dynamic Host Configuration Protocol (DHCP) software agent executes to assign an address and a default name to each device, and the address and a default name are added the interface of the service or device. The software agent 110 then collects device interfaces 72 which include subset or 'device partial XCE' definitions from all the devices locally connected to the home network to generate a 'network partial XCE'. Additional relevant external interfaces can be added to the structure for external control. For example 'service_id' can be a name/address in a received structure or in a network Interface Library 106 including entries from the software agent according to the device interfaces of the devices connected to the network. Thereafter, a user can search for a service in the database and access an application whose interface includes a particular data branch of the library using said name/address. As such, the network can include multiple identical services distinguished by said name/address information.

'media', provides interface for the type of media including, for example, transport stream from a tuner, RAM from a PC DRAM, disk for CD or DVD, and tape. The media can be named and identified, and a controller device can search the XCE data base to identify the media currently provided on the network. When a new media such as DVD disk is provided on the network, that portion of the device interface 72 identifying the program material on the disk is changed accordingly. As such, the entire device interface 72 need not be transferred and only the relevant portion is transmitted to the XCE data base. On receipt of an attention signal, the library software agent 110 can fetch the new update and place it in the proper place in the interface library 106. The addition of the disk media is similar to adding a service to the network or connecting another appliance to the network.

'rate', provides a value for data stream rate for a device interface, such as 6 Mbits/Sec or 19.2 Mbits/Sec, for example.

'protocol', identifies the protocol used for said data stream. If more than one protocol is provided, for example 61883/1394 or UDP/IP, then a desired protocol can be selected.

'stream_format', provides packet format and/or compression standard for digital stream audio and video split. If more than one format is provided, a desired format can be selected via an interface message. A controller application 82 can examine the available formats to determine if there are compatible ones.

'controls_av', provides the main control interface for A/V media appliance.

'Flow_control', provides data stream controls such as: PLAY, STOP, GOTO, RECORD, etc as methods for a particular device. The methods do not change for embedded appliance, except for PC software, for example. The controls can include time parameters for delayed operation.

'Tuning', provides interface for tuning control. A controller device 14 can send a request to the interfaces of a controlled device 14 to send back an Electronic Program Guide (EPG) data structure described above.

'UI control', provides control interface to a controlled application 84 to control adjustments for display such as brightness and contrast, and for audio, such as volume and bass.

'Timer_record' provides interface for set-up data for a controller application 82 to implement delayed time recording. Direct channel tune information and flow control (time_aparams) information can be utilized.

The above description can apply equally to client devices 12. An alternative syntax XCE definition or database for the CE space can be utilized. The alternative syntax XCE data base includes full service descriptions including home automation, appliances and automobile, for example. In cases where a service object provides flexibility and parameters for control, a control method is utilized to control the object as desired. Appendix 3 shows example commands in the AV/C and CAL command languages including binary and hex data strings.

In another aspect, the present invention provides for use of existing command language implementations for device-to-device command and control in a network. Devices can include internal objects and APIs which, at run time, create binary strings according to existing transport mechanisms. In that case, in order to provide XML remote procedure calls (XML RPC) from one device 14 to another device 14 in the network, the exiting application interface implementation is replaced with calls to the XML service API. As such, the original implementation is equivalent to a wrapper for the XML service API. FIG. 18 also shows applications created using other command languages such as CAL or AV/C in dashed lines, with their interface implementations replaced with a wrapper in the XCE/XML service API. Appendix 4 shows examples for changing from CAL command language to XML RPC format.

Figure 23:
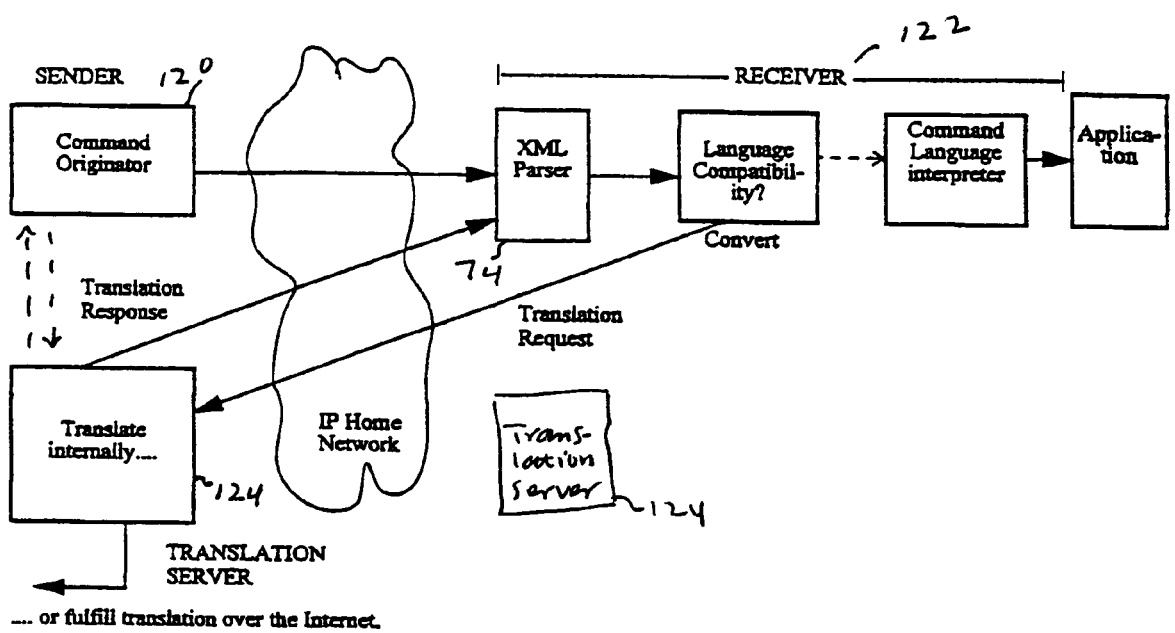
FIG. 23 shows a command transmission and interpretation process between a sender and receiver device.

Referring to FIG. 23, in another aspect, the present invention provides a standard command protocol and control language translation for inter-device communication between disparate devices in a network. For different devices to share information, the information must be in a format that a requesting device can interpret. And, for a device 120 to control another device 22, the two devices must use a common language in order to interpret one another's commands. The present invention provides a common identification format for data and command protocols.

In one embodiment, a method of common presentation or packaging of data and command protocol is provided, whereby a receiving device 122 can determine the native format of transmitted data. If the receiving device 122 can interpret that native format, then it can accept the data directly. Otherwise, the receiving device 122 can request a translator device 124 or application to translate the data into a desired format which the requesting device 122 can interpret. The translator device 124 or application determines the native format of the original data, translates the data into said desired format, and sends the translated data to the requesting device 122.

The requesting device 122 then processes that data as though the data had originally been provided in the requesting device's native language format by the sending device 120. The requesting device 122 can also send a response back to the sending device 120 in the requesting device's native format, or send a response by proxy through the translator device 124 or application for translation into the native format of the sending device 120. The translation method can be utilized for information including command protocols, data files and audio/video streams.

For devices that do not utilize the common format described above, the present invention provides for translation of data including command protocols to, and from, such non-compliant devices. For example, when a non-compliant device 120 sends data to a compliant device 122, the compliant device 122 can translate the data based on a determination of the native format of the data. For example, the compliant device 122 can examine the data for particular bit patterns within the data. When a compliant device sends data to a known non-compliant device, the compliant device can translate the data before transmission based on a determination of the native format of the non-compliant device.

An example implementation can be for a home network which supports the IP and HTTP protocols. The home network can be connected to the Internet to obtain applications and services of various types for desired functionality. As such, the common format method can be made compatible with Internet protocols and procedure for operation over the Internet and the home network.

One example of providing a common data format is utilizing XML to create a package for the data for transmission over the home network. The data can include command protocol, streaming audio or video, graphics or applications. The data is 'wrapped' with a standard header identifying the native format of the data and contents of the package, in XML form. The header allows unique identification of the data type the data portion of the XML code, whereby the data can be translated if necessary and provided to appropriate applications upon receipt.

Under the Web standard, the identification process is performed by browsers using file name extensions to identify the type and contents of a file transmission. The browsers then launch appropriate plug-in modules to process the file. In the home network, XML is utilized to identify data transmissions which provides all home network transmissions over IP with a common identification method as described above.

Alternatively, a software layer can be provided in the home network protocol stack to uniquely identify the contents of all data transmissions over the home network. The software layer can be used instead of XML. The common format and identification principles of the present invention apply equally in either embodiment using XML or said software layer as identification methods.

In FIG. 23, upon receipt of a data package transmission, the receiving device 122 examines the XML identity header of the data package to determine the format of the data therein. If the data is in a format recognizable by the device 122, the XML identity header information is discarded and the device processes the data directly. Otherwise, the device 122 converts the received XML package into an XML translation request package and sends the request package and the data to the translation server device 124.

The translation server device 124 translates the data and converts the translated data into an XML translation response package. The translation server 124 then transmits the response package back to the requesting device 122. In case of a translation error, the translation server 124 can provide a translation response error condition to the requesting device 122. Upon receiving the translated data, the requesting device 122 processes the translated data in the response package.

Example of an XML data package or packet can be:
<IDENTITY type=format=AV/c> . . . packet data . . .
<\IDENTITY>

Example of a translation request package or packet can be:

```
<TRANSLATION REQUEST type=Command format=CAL>
  <IDENTITY type=Command format=AV/C>. . .packet data
. . .</IDENTITY>
  <\TRANSLATION REQUEST>
```

Example of a translation request package or packet can be:
<TRANSLATION RESPONSE type=Command format=CAL> . . . packet data . . .
<\TRANSLATION RESPONSE>

Example of a translation response error condition package or packet can be:

```
<TRANSLATION RESPONSE type=Command format=CAL>. . .
packet data . . .
  <ERROR condition=Unrecognized command>Translation could
    not be performed<\ERROR>
  <\TRANSLATION RESPONSE>
```

Further, Table 3 in FIG. 24 includes a partial list of package or packet types and formats.

To provide translation services, a translation server 124 is identified in the network during network configuration in a manner similar to that of DHCP servers. The translation server 124 broadcasts its IP address to all devices in the network for a period of time after the network is configured. All devices 120, 122 compatible with the translation services store the IP address of the translation server 124 as it is broadcast over the network during network boot up.

Alternatively, the requesting device 122 can broadcast a translation request over the home network. All translation servers 124 in the network that receive the translation request can respond to the translation request by sending a translation response to the requesting device 122. The requesting device 122 then selects one translation server 124 among the responding translation servers. In one example, the requesting device 122 selects the first translation server 124 that responds to the translation request. In another example, the translation servers 124 can negotiate among themselves and/or with the requesting device 122 for the selection of a translation server 124 for satisfying the translation request.

In another embodiment of the invention, multiple translation servers 124 are utilized to fulfill all translation requests. For example, a single translation server 124 may not have the capability to translate all requests. In such cases, it is necessary to identify the address of each translation server 124 and the type of translation service each translation server 124 can provide. Each device 120, 122 can store a list of all translation server IP addresses and a corresponding list of the types of translation services each translation server 124 provides, and optionally the associated translation application.

For efficiency, if a sending device 120 wishes to send data to a receiving device 122 which is known to use a different native format than that of the sending device 120, the sending device 120 can send the data to the receiving device 122 by proxy through a translation server 124. The sending device 120 transmits a command to the translation server 124 similar to the translation request command and includes the address of the receiving device 122 as the destination for the translated data.

In cases where a receiving device 122 requires translation of a data stream, the sending device 120 can route the data stream directly to a translation server 124, and the translation server 124 in turn transmits the translated data to the receiving device 122 as described above. Alternatively, the sending device 120 can send the data stream to the receiving device 122, and the receiving device 122 then routes the data stream to the translation server 124 for translation and return of the translated data back to the receiving device 122.

In the description herein, the control mechanism is based on the Hypertext Transfer Protocol (HTTP 1.1) which provides an application-level protocol for distributed, collaborative, hypermedia information systems. HTTP is a generic, stateless, object-oriented protocol in wide use for many tasks. A feature of HTTP is the typing and negotiation of data representation, allowing systems to be built independently of the data being transferred. Preferably, the network protocol used by devices and applications on the home network is IP (Internet Protocol). However, other protocols can also be utilized.

Although the present invention has been described in considerable detail with regard to the preferred versions thereof, other versions are possible. Therefore, the appended claims should not be limited to the descriptions of the preferred versions contained herein.

APPENDIX 1

```
                interface.dtd
                rules for describing an object interface in xml <!ELEMENT   parameter    #PCDATA>
<!ATTLIST   parameter
                         type       CDATA     #REQUIRED
                         >
<!ELEMENT   method       (#PCDATA, (parameter)+)>
<!ELEMENT   object       (#PCDATA, (method)+)> interface.h
                example object interface in c
```

APPENDIX 1-continued

```
/* object */
typedef struct Stream {
        int id;
};
/* methods */
void StreamPlay (int id, int speed);
void StreamStop (int id);

interface.xml
                the same object in xml using rules of interface.dtd <object>Stream
        <method>Play
                <parameter type="int">id</parameter>
                <parameter type="int">speed</parameter>
        </method>
        <method>Stop
                <parameter type="int">id</parameter>
        </method>
<object> call.dtd
                rules for describing a c function call in xml

<!ELEMENT   parameter    #PCDATA>
<!ATTLIST   parameter
                         value      CDATA     #REQUIRED
                         >
<!ELEMENT   method       (#PCDATA, (parameter)+)>
<!ELEMENT   object       (#PCDATA)>
<!ELEMENT   call                    (object,method)> controller.c
                example controller command in c

.
.
.
StreamPlay (0x01ae, 500);
.
.
.

call.xml
                the same command in xml using call.dtd

<!-- example to play a stream -->
<call>
        <object>Stream</object>
        <method>Play</method>
        <parameter value="01ae">id</parameter>
        <parameter value="500">speed</parameter>
</call>
```

APPENDIX 2

```
<!------------------------------------------------------------
                call.dtd
                rules for describing a c function call in xml
-------------------------------------------------------------->
<!ELEMENT   parameter    #PCDATA>
<!ATTLIST   parameter
                         value      CDATA     #REQUIRED
                         >
<!ELEMENT   method       (#PCDATA, (parameter)+)>
<!ELEMENT   object       (#PCDATA)>
<!ELEMENT   call                    (object,method)>
<!------------------------------------------------------------
                interface.dtd
                rules for describing an object interface in xml
-------------------------------------------------------------->
<!ELEMENT   parameter    #PCDATA>
<!ATTLIST   parameter
                         type       CDATA     #REQUIRED
                         >
```

APPENDIX 2-continued

```
<!ELEMENT  method   (#PCDATA, (parameter)+)>
<!ELEMENT  object   (#PCDATA, (method)+)>
<!------------------------------------------------------------
              interface.xml
              this document describes various CE services offered –a
              subset of the whole CE space.
------------------------------------------------------------>
<?xml version="1.0"?>
<!DOCTYPE interface SYSTEM "interface.dtd">
<object>Stream
        <method>Open
                <parameter type="int">id</parameter>
                <parameter type="int">channel</parameter>
        </method>
        <method>Close
                <parameter type="int">id</parameter>
        </method>
</object>
<object>Control
        <method>Set
                <parameter type="int">id</parameter>
                <parameter type="int">level</parameter>
        </method>
</object>
<object>Storage
        <method>Open
                <parameter type="int">id</parameter>
                <parameter type="int">channel</parameter>
        </method>
        <method>Record
                <parameter type="int">id</parameter>
        </method>
        <method>Play
                <parameter type="int">id</parameter>
                <parameter type="int">speed</parameter>
        </method>
        <method>Stop
                <parameter type="int">id</parameter>
        </method>
        <method>Close
                <parameter type="int">id</parameter>
        </method>
</object>
<object>Display
        <method>Open
                <parameter type="int">id</parameter>
                <parameter type="int">channel</parameter>
        </method>
        <method>Render
                <parameter type="int">id</parameter>
        </method>
        <method>Blank
                <parameter type="int">id</parameter>
        </method>
        <method>Control
                <parameter type="int">id</parameter>
                <parameter type="int">cid</parameter>
                <parameter type="int">level</parameter>
        </method>
        <method>Close
                <parameter type="int">id</parameter>
        </method>
</object>
<!------------------------------------------------------------
              otr.xml
              an xml representation of one touch record
              c representation:
              StreamOpen (100, 2);/* play a stream (pushed by
              satellite feed) */
              StorageOpen (24, 2);/* open a storage service */
              StorageRecord (24);/* record the stream */
------------------------------------------------------------>
<?xml version="1.0"?>
<!DOCTYPE interface SYSTEM "call.dtd">
<call>
        <object>Stream</object>
        <method>Open</method>
                <parameter value="100">id</parameter>
                <parameter value="2">channel</parameter>
</call>
<call>
        <object>Storage</object>
        <method>Open</method>
                <parameter value="100">id</parameter>
                <parameter value="2">channel</parameter>
</call>
<call>
        <object>Storage</object>
        <method>Record</method>
                <parameter value="100">id</parameter>
</call>
```

APPENDIX 3

```
consumer (document_file, doc)
     +----document_file<server_home.dtd, server_auto.dtd>
     +----doc (avc_commands, cal_commands, services_home, server_auto, server_samsung_web_site,
server_auto_ford_explorer_98,,)
          +----avc_commands<...command_string...>
          +----cal_commands<...command_string...>
          +----services_home (client, av, lighting, comms, hvac, utility, security, appliance, convenience,,)
               +----xml_utility (download_DTD_file,,)
               +----client (acknowledge, attention, error, post_message, sound, stop_schedule, stop_all,,)
                    +----sound (alarm, ring, buzz,,)
               +----server_av (source, sink)
                    +----source (service_id, media, rate, protocol, stream_format, controls_gen, controls_av,,)
                    +----sink (service_id, media, rate, protocol, stream_format, controls,,)
                         +----service_id (url,,)
                         +----media (tpt_stream, ram, disk, tape,,)
                              +----disk (name, number,,)
                         +----rate<value>
                         +----protocol (61883/1394, UDP/IP/Ethernet,,)
                              +----61883/1394 (isoch_ch_no)
                         +----stream_format (video, audio,,)
                              +----video (dv, mpeg2tpt, dsstpt, mpeg2pes, mpeg1080i-tpt,)
                              +----audio (mpeg3, no-3, midi,,)
                         +----controls_gen (ping, process_info, setup,,)
                         +----controls_sv (flow_control, tune, timer_record, ui_control,,)
                              +----process_info (s/w_id, h/w_id)
                                   +----h/w_id (ser_no, manuf, model, class,,)
                                   +----s/w_id (ser_no, exe_name, version,,)
                              +----setup (clock,,)
                                   +----clock (hours, minutes, seconds)
                              +----time_record (tune, flow_control)
                              +----flow_control (play, stop, goto, record,,)
                                   +----play (time_params)
                                   +----record (time_params)
                              +----tune (send_epg, channel,,)
                                        +----channel (number, id, time_params,,)
                                             +----time_params (now, start, duration, end,,)
                              +----ui_control (display, acoustic)
                                   +----display (brightness, contrast, color/tint, horiz_size, vert_size,,)
                                   +----acoustic (volume, bass, treble, balance, fade,)
               +----lighting (sensors, lights, send_epg)
               +----sensors (living_room, sky,,)
               +----lights (rooms_up, rooms_down, yard,,)
                    +----rooms_up (bed1, bed2, bed3, bed4,,)
                    +----rooms_down (family, kitchen, living, dining, soho, garage,,)
                    +----yard (front, back)
                         +----bed1 (lamp, dimmer,,)
                              +----dimmer<value>
               +----comms (netman, intercom, telco,)
                    +----netman(send_device_list, send_configuration, send_snmp_mib,,)
                    +----intercom( )
                    +----telco( )
               +----hvac (controls_gen, controls_hvac,,)
                    +----controls_hvac (a/c, heat, temp, humidity,)
                         +----temp (low, high, hysteresis,,)
               +----utility(meters, energy_mgmt,,)
                    +----meters (water, gas, electric,,)
                         +----water<value>, gas<value>, electric<value>
               +----security(sensors, send_epg, alarm,,)
                    +----sensors (peripheral, motion,,)
                         +----peripheral (rooms_up, rooms_down,,)
                         +----motion (rooms_down, yard,,)
               +----appliances (microwave, range, oven, fridge, freezer, coffee, toaster, washer, dryer, water_heater,,)
                    +----microwave (send_epg, controls,,)
                    +----fridge (temp,,)
                    +----water_heater (temp)
               +----convenience (window, curtain_open, door/gate, pool/spa, bath, fountain, lift,,)
                    +----curtain_open<value>
          +----server_auto (message, mileage, maintenance,,)
               +----mileage<data>
               +----maintenance<data>
```

APPENDIX 4

```
existing implementation:
void DeviceCALCommand (int command) {
    .
    .
    .
    /*
    create CAL formatted byte string to represent this object/method
    and output to the wire
    */
    CreateCALFormattedByteString(command);  /* different for every
                                               protocol */
    SendCALByteString( );                    /* different for every protocol */
}
``` wrapping the XML Service API call:
```
void DeviceCALCommand (int command) {
{
    /*
    replace CAL implementation with calls to the XML ServiceAPI
    */
    CreateXMLMessage (command);              /* always the same */
    SendXMLMessage ( );                      /* always the same */
}
```

APPENDIX 5

```
consumer (document_file, doc)
    +----document_file<server_home.dtd, server_auto.dtd>
    +----doc (services_home, server_auto, server_samsung_web_site,, avc_commands, cal_commands,,)
        +----services_home (xml_utility, client, server_av, lighting, comms, hvac, utility, security,
appliances, convenience,,)
            +----xml_utility (download_DTD_file,,)
            +----client (acknowledge, attention, error, post_message, sound, stop_schedule, stop_all,,)
                +----sound (alarm, ring, buzz,,)
            +----server_av (controls_gen, source, sink)
                +----controls_gen (ping, process_info, setup,,)
                    +----process_info (s/w_id, h/w_id)
                        +----h/w_id (ser_no, manuf, model, class,,)
                        +----s/w_id (ser_no, exe_name, version,,)
                    +----setup (clock,,)
                        +----clock (hours, minutes, seconds)
                +----source (service_id, media, rate, protocol, stream_format, controls_av,,)
                +----sink (service_id, media, rate, protocol, stream_format, controls_av,,)
                    +----service_id (url,,)
                    +----media (tpt_stream, ram, disk, tape,,)
                        +----disk (name, number,,)
                    +----rate<value>
                    +----protocol (61883/1394, UDP/IP/Ethernet,,)
                        +----61883/1394 (isoch_ch_no)
                    +----stream_format (video, audio,,)
                        +----video (dv, mpeg2tpt, dsstpt, mpeg2pes, mpeg1080i-tpt,)
                        +----audio (mpeg3, ac-3, midi,,)
                    +----controls_av (flow_control, tune, timer_record, ui_control,,)
                        +----timer_record (tune, flow_control)
                            +----flow_control (play, stop, goto, record,,)
                                +----play (time_params)
                                +----record (time_params)
                                    +----time_params (now, start, duration, end,,)
                            +----tune (send_epg, channel,,)
                                +----channel (number, id, time_params,,)
                            +----ui_control (display, acoustic)
                            +----display (brightness, contrast, color/tint, horiz_size, vert_size,,)
                            +----acoustic (volume, bass, treble, balance, fade,)
            +----lighting (sensors, lights, send_epg)
                +----sensors (living_room, sky,,)
                +----lights (rooms_up, rooms_down, yard,,)
                    +----rooms_up (bed1, bed2, bed3, bed4,,)
                        +----bed1 (lamp, dimmer,,)
                            +----dimmer<value>
                    +----rooms_down (family, kitchen, living, dining, soho, garage,,)
                    +----yard (front, back)
            +----comms (homehub, intercom, telco,)
                +----homehub(send_device_list, send_configuration, send_snmp_mib,,)
                +----intercom( )
                +----telco( )
            +----hvac (controls_gen, controls_hvac,,)
                +----controls_hvac (a/c, heat, temp, humidity,)
                    +----temp (low, high, hysteresis,,)
```

APPENDIX 5-continued

```
    +----utility(meters, energy_mgmt,,)
        +----meters (water, gas, electric,,)
            +----water<value>, gas<value>, electric<value>
    +----security(sensors, send_epg, alarm,,)
        +----sensors (peripheral, motion,,)
            +----peripheral (rooms_up, rooms_down,,)
            +----motion (rooms_down, yard,,)
    +----appliances (microwave, range, oven, fridge, freezer, coffee, toaster, washer, dryer,
water_heater,,)
        +----microwave (send_epg, controls,,)
        +----fridge (temp,,)
        +----water_heater (temp)
    +----convenience (window, curtain_open, door/gate, pool/spa, bath, fountain, lift, jacuzzi,,)
        +----curtain_open<value>
  +----server_auto (message, server_auto_ford_explorer_98,,)
    +----server_auto_ford_explorer_98 (mileage, maintenance,,)
        +----mileage <data>
        +---- maintenance <data>
  +----server_samsung_web_site(message, service, help,,,)
  +----avc_commands<...command_string...>
        +----service_id (url,,)
  +----cal_commands<...command_string...>
        +----service_id (url,,)
```

What is claimed is:

1. A method for performing a service on a home network, the method comprising the steps of:
   (a) connecting a first home device to the home network;
   (b) connecting a second home device to the home network;
   (c) (1) querying the first home device to obtain first application interface description data, and querying the second home device to obtain second application interface description data, wherein each application interface description data includes information for commanding and controlling of the corresponding home device by another device connected to the network, and (2) storing the obtained first and second application interface description data in a data base;
   (d) the second home device accessing the first application interface description data for the first home device in the database;
   (e) the first home device accessing the second application interface description data for the second home device in the database;
   (f) sending control and command data from the first home device to the second home device utilizing said second application interface description data for the second home device over the network; and
   (g) sending control and command data from the second home device to the first home device utilizing said first application interface description data for the first home device over the network;
   whereby the first and second home devices autonomously perform said service.

2. The method of claim 1 wherein at least one application interface description data includes XML format.

3. The method of claim 1 wherein step (c) includes connecting a database device to the network, wherein the database device stores said database.

4. The method of claim 3 wherein:
   (i) the first home device stores the first application interface data therein;
   (ii) the second home device stores the second application interface data therein; and
   (iii) step (c) includes the steps of querying the first and second home devices to transfer said application interface data for the first and second home devices to the database device over the network.

5. The method of claim 1 wherein step (d) includes providing the first application interface description data for the first home device from the database to the second home device over the network.

6. The method of claim 1 wherein step (e) includes providing the second application interface description data for the second home device from the data base to the first home device over the network.

7. The method of claim 1 further comprising connecting three or more home devices to the network, wherein at least one home device accesses the database to query the application interface description data of a plurality of home devices for sending command and control data to the plurality of home devices over the network.

8. The method of claim 1 wherein each application interface description data includes data in a structured format.

9. The method of claim 1 wherein step (c) further includes the steps of providing an agent that creates the data base.

10. The method of claim 1 wherein step (c) further includes the steps of providing an agent that creates the data base by obtaining the application interface description data of each device and storing it in the database.

11. A network system for providing a service, comprising:
   (a) a physical layer, wherein the physical layer provides a communication medium that can be used by devices to communicate with each other;
   (b) first home device;
   (c) a second home device;
   (d) a controller that queries the first home device to obtain first application interface description data, and queries the second home device to obtain second application interface description data, wherein each application interface description data includes information for commanding and controlling of the corresponding home device by another device connected to the network, wherein the controller stores the obtained first and second application interface description data in a data base;
   the second home device including application control means for accessing the first application interface description data for the first home device in the database and sending control and command data from the second home device to the first home device utilizing said first application interface description data; and the first home device including application control means for accessing the second application interface description data for the second home device in the database and sending control and command data from the first home device to the second home device utilizing said second application interface description data;

whereby the first and second home devices autonomously perform said service.

12. The network system of claim 11 wherein at least one application interface description data includes XML format.

13. The network system of claim 11 wherein the controller further comprises a data base device storing said database.

14. The network system of claim 13 wherein:
  (i) the first home device stores first application interface description data therein;
  (ii) the second home device stores second application interface description data therein; and
  (iii) said database device forms said database by querying the first and second home devices to transfer said first and second application interface description data, respectively, to the database device over the network.

15. The network system of claim 11 wherein the control application means of the second home device obtains the first application interface description data for the first home device from the database.

16. The network system of claim 11 wherein the control application means of the first home device obtains the second application interface description data for the second home device from the data base.

17. The network system of claim 11 further comprising three or more home devices, wherein at least one home device accesses the database to query the application interface description data of a plurality of home devices for sending command and control data to the plurality of home devices over the network.

18. The network system of claim 11 wherein each application interface description data includes data in a structured format.

19. The network system of claim 18 wherein the structured format includes XML format.

20. The network system of claim 11 wherein the controller includes an agent that creates the data base.

21. The network system of claim 11 wherein the controller includes an agent that creates the data base by obtaining the application interface description data of each device and storing it in the database.

22. In a network system for providing a service, the network system including a physical layer, wherein the physical layer provides a communication medium that can be used by devices connected to the layer to communicate with each other, a controller comprising an agent that generates a database accessible by said devices, the database including a plurality of application interface description data objects, each application interface description data object including information for commanding and controlling of a home device by one or more other home devices connected to the network, whereby a first device can access an application interface description object for another device in the database and send control and command data to that other device utilizing said application interface description object, such that the two devices perform said service.

23. A method for performing a service on a home network, the method comprising the steps of:
  (a) connecting a first home device to the home network;
  (b) connecting a second home device to the home network;
  (c) providing a database including a plurality of application interface description data objects, each application interface description data object including information for commanding and controlling of a home device by one or more other home devices connected to the network;
  (d) the first home device accessing an application interface description object for the second home device in the database; and
  (e) the first device sending control and command data to the second home device utilizing said application interface description object for the second home device over the network, whereby the first and second home devices autonomously perform said service.

24. The method of claim 23 wherein step (c) includes connecting a database device to the network, wherein the database device stores said database.

25. The method of claim 24 wherein:
  (i) the second home device stores its application interface data therein; and
  (ii) step (c) includes an initial step of forming said database by steps including querying the second home device to transfer said application interface data for the second home devices to the database device.

26. The method of claim 23 wherein step (d) includes providing the application interface description object for the second home device from the database to the first home device over the network.

27. The method of claim 23 further comprising the steps of connecting three or more home devices to the network, wherein at least one home device accesses the database to query the application interface description objects of a plurality of home devices for sending command and control data to the plurality of home devices over the network.

* * * * *